US005549437A

United States Patent [19]

Kishi

[11] Patent Number: 5,549,437

[45] Date of Patent: Aug. 27, 1996

[54] FORK LIFT TRUCK LOADING MECHANISM

[75] Inventor: Mitsuhiro Kishi, Ashikaga, Japan

[73] Assignee: Nikken Corporation, Tokyo, Japan

[21] Appl. No.: 353,434

[22] Filed: Dec. 9, 1994

[30] Foreign Application Priority Data

| | | | |
|---|---|---|---|
| Dec. 20, 1993 | [JP] | Japan | 5-344955 |
| Jul. 18, 1994 | [JP] | Japan | 6-187814 |

[51] Int. Cl.$^6$ .................... B60P 1/16; B60P 3/06

[52] U.S. Cl. .................... 414/462; 280/766.1; 414/467; 414/546

[58] Field of Search .................... 414/462, 467, 414/469, 546, 539; 280/763.1, 764.1, 765.1, 766.1

[56] References Cited

U.S. PATENT DOCUMENTS

| | | | |
|---|---|---|---|
| 2,595,453 | 5/1952 | Gilmore | 280/763.1 |
| 2,676,720 | 4/1954 | Noble | 414/467 X |
| 2,885,220 | 5/1959 | Dalton | 280/766.1 |
| 2,956,698 | 10/1960 | Wills | 414/546 |
| 3,454,251 | 7/1969 | Dye | 280/765.1 X |
| 3,666,122 | 5/1972 | Youmans | 414/546 X |
| 4,228,967 | 10/1980 | Woodruff | 414/546 X |
| 4,571,139 | 2/1986 | Moseley et al. | 414/467 X |
| 4,619,570 | 10/1986 | Siebenga | 414/469 X |
| 5,370,494 | 12/1994 | Holmes et al. | 414/467 X |

FOREIGN PATENT DOCUMENTS

| | | | |
|---|---|---|---|
| 571240 | 11/1993 | European Pat. Off. | 414/467 |
| 2402704 | 8/1974 | Germany | 414/467 |
| 2601668 | 7/1976 | Germany | 414/467 |
| 2948 | 1/1977 | Japan | 414/467 |
| 296599 | 6/1992 | Japan | 280/765.1 |

*Primary Examiner*—David A. Bucci
*Attorney, Agent, or Firm*—Flynn, Thiel, Boutell & Tanis, P.C.

[57] ABSTRACT

A fork lift truck loading mechanism mounted on a chassis of a movable truck for loading a self-propelled fork lift truck by connection to the forks of the fork lift truck so as to hold the fork lift truck and turning of the forks together with the fork lift truck onto a bed of the truck. The fork lift truck loading mechanism comprises a holding arrangement which is supported by the chassis of the truck so as to be movable therewith and turned from substantially a horizontal position to a substantially perpendicular or forwardly inclined position so as to hold the forks of the fork lift truck, and a rotary drive interposed between the truck and the holding arrangement for turning the holding arrangement.

20 Claims, 21 Drawing Sheets

FORK LIFT TRUCK LOADING MECHANISM

FIELD OF THE INVENTION

The present invention relates to a fork lift truck loading mechanism mounted on a vehicle body for loading a fork lift truck which is self-propelled and used for loading and unloading operations.

BACKGROUND OF THE INVENTION

A fork lift truck is widely used for carrying or lifting a heavy object or a pallet in a warehouse, factory or office. This fork lift truck has wheels and is self-propelled, and can carry a heavy object without resorting to manpower, i.e. another operator, thereby contributing to ease of loading and unloading. Since this fork lift truck is required to lift the heavy object, it has a mast mechanism or counterweight thereon, which makes it heavy, thereby preventing it from traveling fast on a highway. Accordingly, the fork lift truck travels only within a limited area such as a factory or warehouse. As a result, the traveling speed of the fork lift truck when it carries the heavy object thereon is about 20 to 30 km/h which is relatively slow compared with other vehicles. When it is self-propelled for a long distance, it takes much time. If the loading or unloading operations are performed at other locations, another fork lift truck is required.

If the fork lift truck travels on a public road, it is necessary to obtain permission (such as a vehicle number plate) from a competent authority. However, when the fork lift truck is used only in the factory or warehouse, such permission is not necessary in many cases. Accordingly, when the fork lift truck is moved from one factory or warehouse to another factory or warehouse, it is customary to load the fork lift truck on a bed of a truck which is qualified to travel legally on a highway.

Furthermore, when the fork lift truck is carried to a destination while loaded on the truck, if another fork lift truck is not provided at the destination, the carried fork lift truck must be unloaded from the truck with the help of other operators. However, due to shortage of manpower, the freight or cargo often cannot be unloaded from the truck. In such case, the fork lift truck is located on the truck bed together with other freight and the fork lift truck and other freight are unloaded from the truck bed at the destination, which is effective and reduces the burden imposed on the operator.

As mentioned above, if the fork lift truck can be loaded on the truck bed, it is very convenient since it can be useful for loading or unloading other freight or cargo. However, since the fork lift truck per se is relatively large in bulk and has the counterweight, etc., it is heavy. Accordingly, if the fork lift truck is loaded on the truck bed, it is lifted by a crane or by a long plate bridging between the bed and the ground. Such an operation is troublesome and requires an exclusive device for loading the fork lift on the truck bed, which impedes a quick loading operation.

SUMMARY OF THE INVENTION

In view of the aforementioned problem, a first aspect of the present invention is to provide a fork lift truck loading mechanism fixed to a chassis of the truck which can travel at high speed, and forks of the fork lift truck are engaged in the loading mechanism so that the fork lift truck can be lifted onto the truck bed by itself. Accordingly, the fork lift truck can be carried at high speed to the destination where it performs loading and unloading operations, and hence it is not necessary to travel to the destination at low speed. Furthermore, it is not necessary to arrange another fork lift truck at the destination and it can be used for loading and unloading operations by itself.

It is another object of the invention to provide an improved fork lift truck loading apparatus capable of loading and unloading the fork lift truck on the truck and capable of safely fixedly holding the fork lift truck on the truck.

To achieve the above objects, the fork lift truck loading mechanism according to the invention is mounted on a vehicle body for loading a fork lift truck which is self-propelled and can lift cargoes by forks thereof to perform loading and unloading operations. The fork lift truck loading mechanism is mounted on a movable truck for connecting to the forks of the fork lift truck so as to hold the fork lift truck and turning the forks together with the fork lift truck on a bed of the truck.

According to aspects of the present invention, fork receivers are supported by a rear portion of the chassis of the truck to be turned vertically through which forks of the fork lift truck can be inserted and they can be moved substantially horizontally and turned substantially vertically by a hydraulic cylinder. The forks of the fork lift truck are inserted into and engaged into the fork receivers which are positioned substantially horizontally relative to the ground when the forks of the fork lift truck are slightly lifted. Thereafter, the forks of the fork lift truck are pushed downward so that the fork lift truck is lifted relative to the ground and further lifted to the position close to the upper surface of the truck bed since the fork receivers are fixed to the chassis.

Then, the hydraulic cylinder is operated to turn the fork receivers from the substantially horizontal angular position to the substantially perpendicular angular position so that the forks and fork lift truck are turned together with the fork receivers, whereby most of the fork lift truck is loaded on the bed of the truck. In such a manner, since the fork lift truck is fixed to the truck bed, it can be moved for a long distance in a short time when the truck travels. At this time, the fork receivers are raised substantially vertically, and the forks of the fork lift truck are inserted into the fork receivers from above, the fork lift truck does not come off from the chassis of the truck and it does not drop from the truck on the earth even if the truck travels a long time.

A fork lift truck loading mechanism mounted on a movable truck according to the further aspect of the invention comprises a holding means which are supported by a chassis of the truck so as to be movable horizontally and turned substantially perpendicularly so as to hold forks of the fork lift truck, rotary means interposed between said truck and said holding means for turning said holding means and supporting means having holding means for supporting the rear portion of the bed of the truck from the lower side thereof.

DETAILED DESCRIPTION

First Embodiment (FIGS. 1 to 7)

Figure 1:
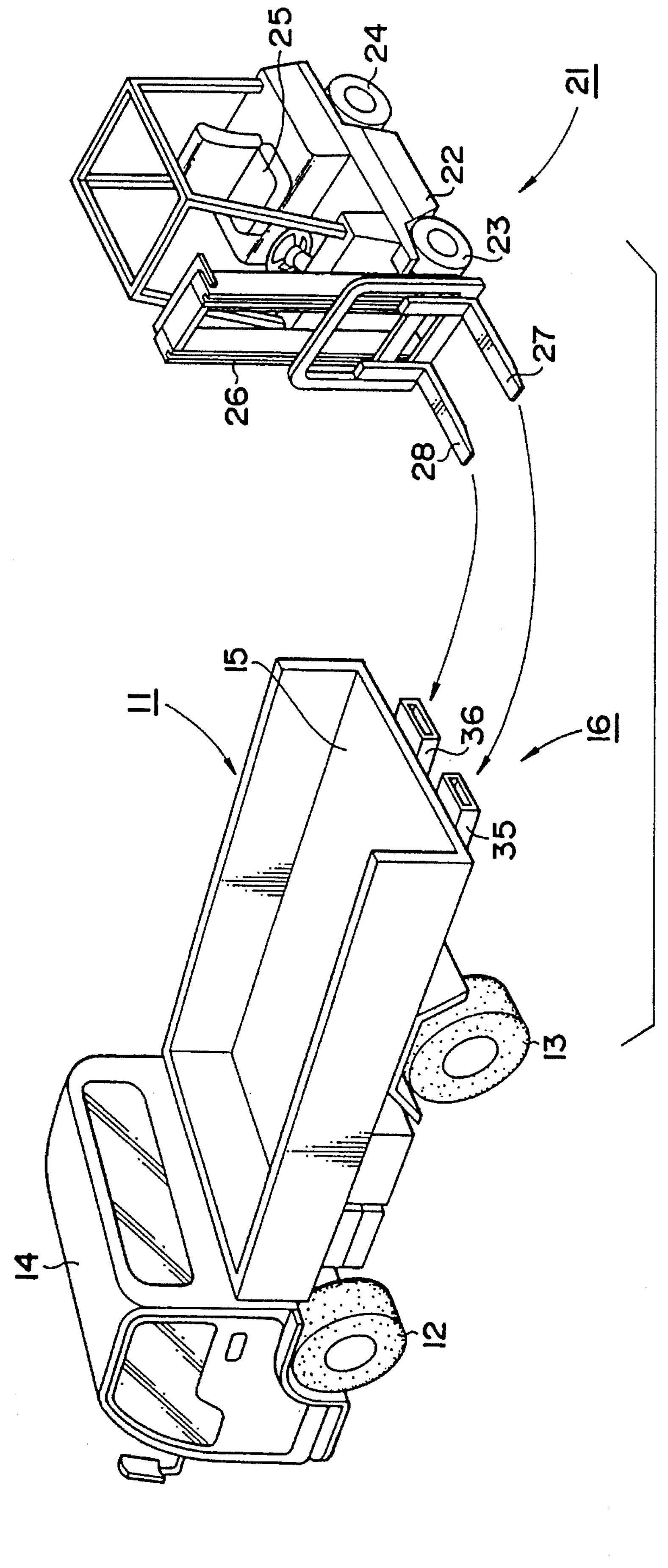
FIG. 1 is an overall external view of a truck having a fork lift truck loading mechanism and a fork lift truck according to a first embodiment of the invention.

A fork lift truck loading mechanism according to a first embodiment will be described with reference to FIGS. 1 to

7. FIG. 1 shows an outer appearance of a truck 11 on which a fork lift truck loading mechanism 16 is mounted and a fork lift truck 21 is to be loaded on the truck 11.

The truck 11 comprises front wheels 12 which are steerable in the traveling direction, rear wheels 13 for driving the truck 11, both of which are respectively supported by a truck chassis 18 (FIG. 4), described later, a cabin 14 for a driver provided on the front wheels and the fork lift truck loading mechanism 16 (hereinafter referred to as the loading mechanism) mounted on the chassis 18 at the rear portion of a bed 15 of the truck 11. The loading mechanism 16, details of which are described later, is a feature of the present invention. The truck 11 is conventional.

The fork lift truck 21 is of generally conventional structure. That is, the fork lift truck incorporates a sealed battery by which it is electrically driven. Front wheels 23 are supported by a chassis 22, constituting a body of the fork lift truck 21, at the front portion thereof and rear wheels 24 are supported by the chassis 22 at the rear portion thereof. A seat 25 on which a driver sits is fixed to the upper portion of the chassis 22. An arch-shaped mast 26 is fixed to the front portion of the chassis 22. A pair of forks 27 and 28 which extend forward substantially horizontally are disposed in a given interval in front of the mast 26. The forks 27 and 28 are movable vertically along a guide rail formed on the mast 26. The arrangement of these elements are known.

The fork lift truck 21 is connected to the truck 11 in the manner that the forks 27 and 28 are inserted into fork receivers 35 and 36 provided on the loading mechanism 16, and the former are engaged into the latter so that the entire fork lift truck 21 can be placed or loaded on the rear upper surface of the bed 15.

Figure 2:
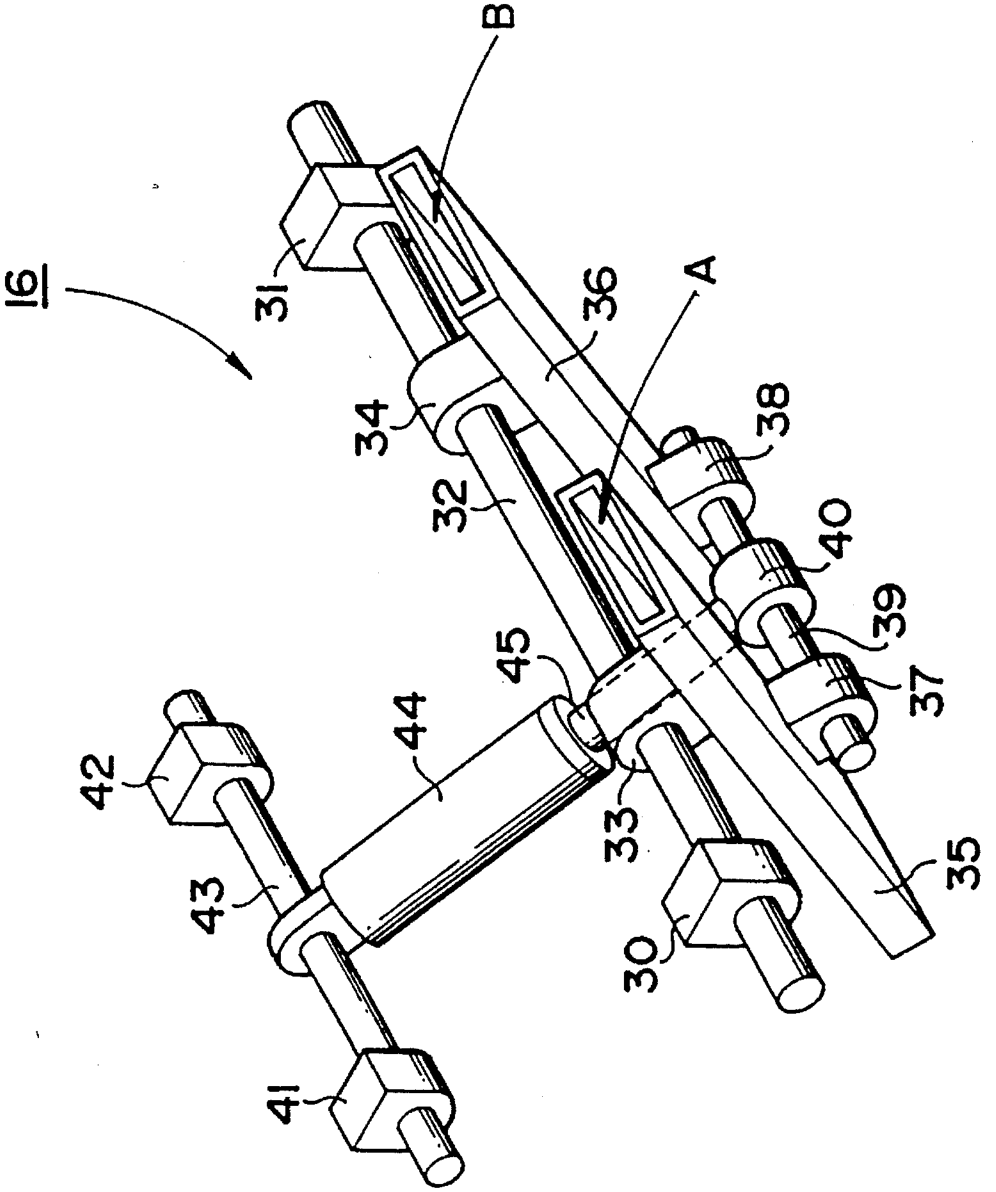
FIG. 2 is a perspective view showing the fork lift truck loading mechanism of FIG. 1 removed from the chassis of a truck.
Figure 3:
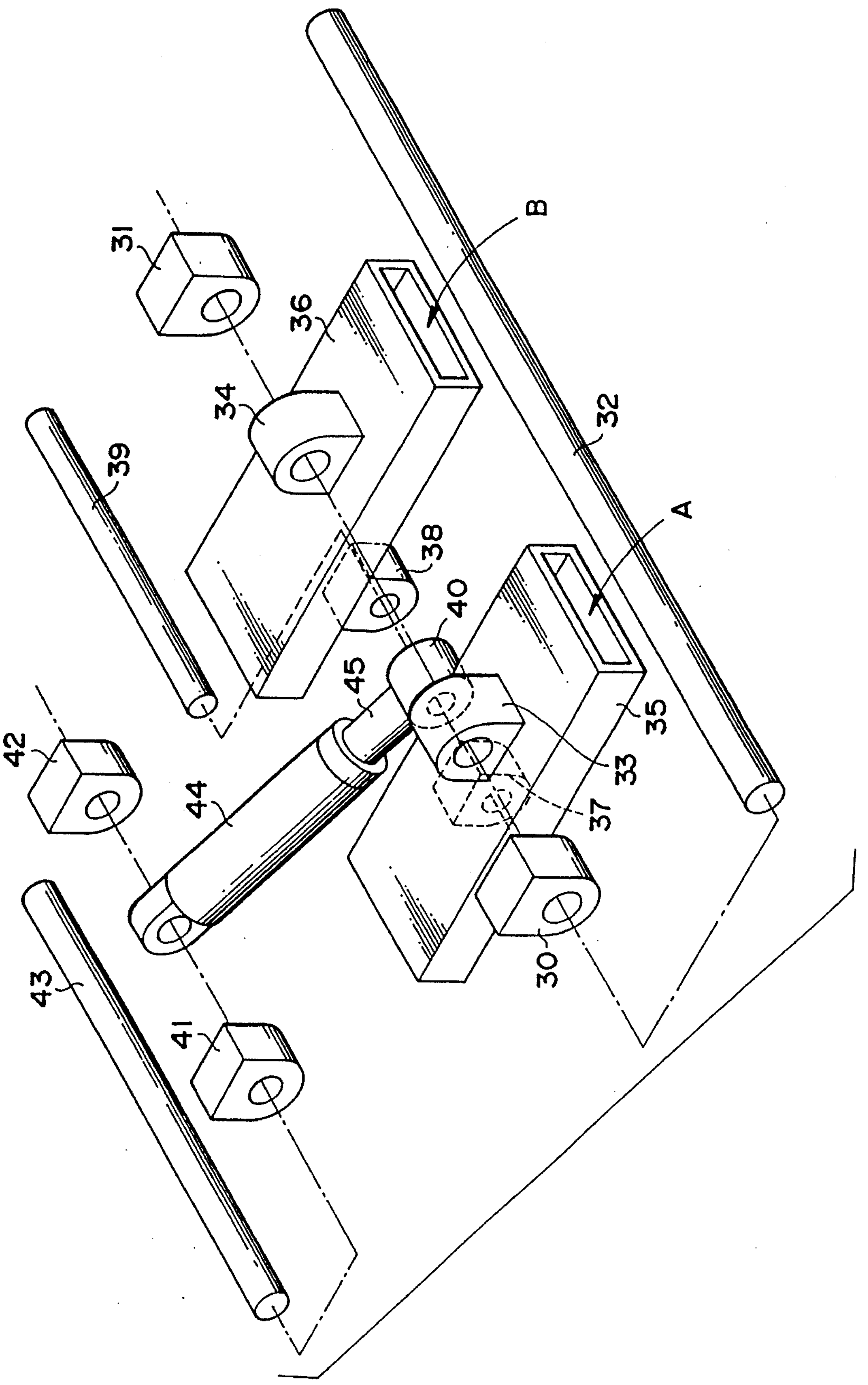
FIG. 3 is an exploded perspective view of the fork lift truck loading mechanism of FIG. 1.
Figure 4:
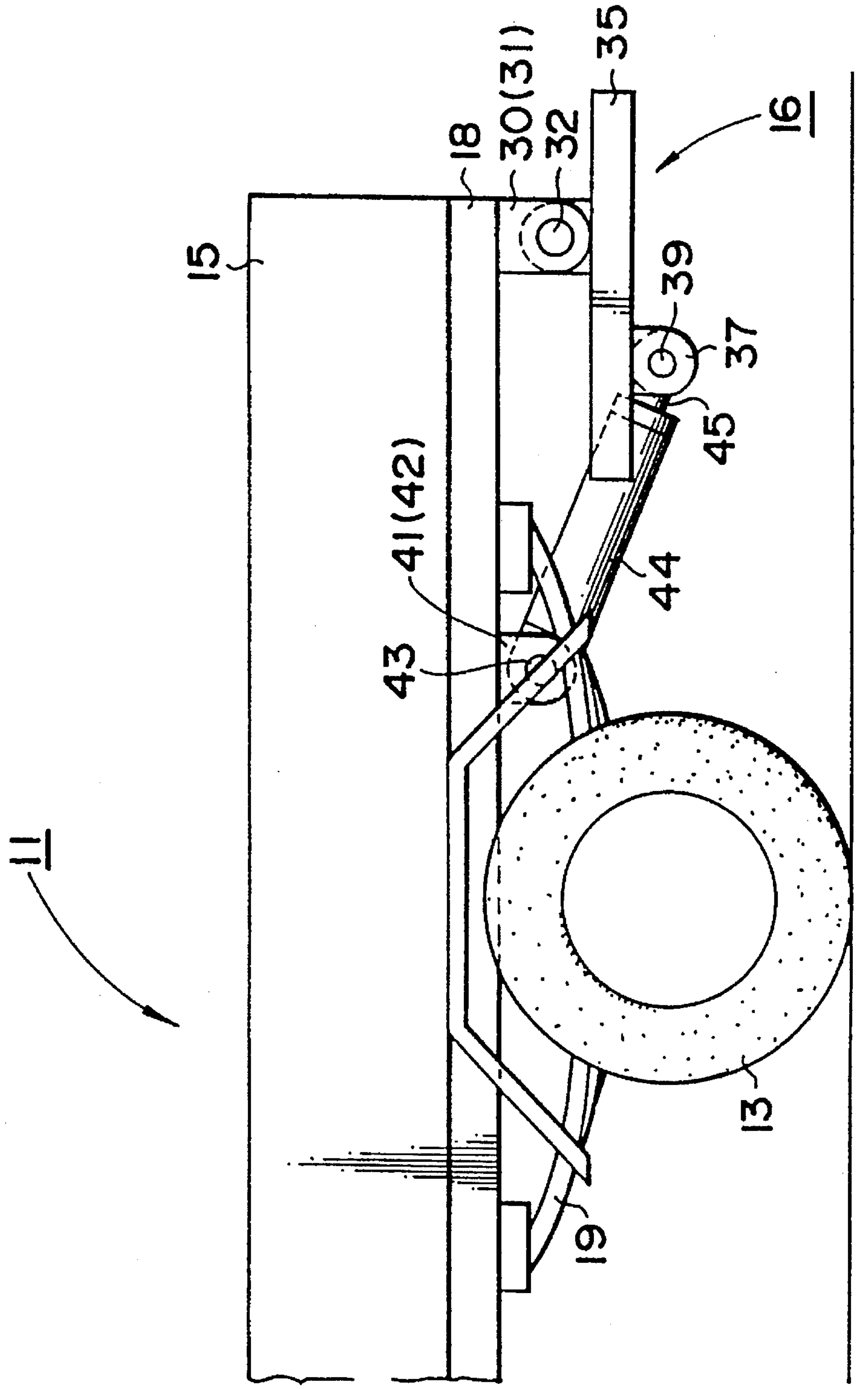
FIG. 4 is a side view showing the state where the fork lift truck loading mechanism of FIG. 1 is fixed to the chassis of the truck.

FIG. 2 shows a detailed arrangement of the loading mechanism 16. A pair of shaft supporters 30 and 31 are fixed in a given spacing to a lower rear end of the chassis 18 which serves as the frame of the truck 11, and a shaft 32, the axis of which is arranged perpendicular to the traveling direction of the truck 11, is inserted into the shaft supporters 30 and 31. A pair of rotary shaft supporters 33 and 34 into which the shaft 32 is inserted are positioned between the shaft supporters 30 and 31 and they can be turned about the shaft 32. The rotary shaft supporter 33 is fixed to an upper surface of the fork receiver 35 and the rotary shaft supporter 34 is fixed to an upper surface of the fork receiver 36. The fork receivers 35 and 36 can be formed by bending steel sheet or plate, and are hollow tubes of rectangular cross section. An insertion hole A is formed in the fork receiver 35 and extends in the longitudinal direction thereof and an insertion hole B is formed in the fork receiver 36 in the longitudinal direction thereof.

A shaft supporter 37 is fixed to a lower surface of the fork receiver 35 and is positioned remote from the rotary shaft supporter 33, and a shaft supporter 38 is fixed to a lower surface of the fork receiver 36 and is positioned remote from the rotary shaft supporter 34. An operation shaft 39 is inserted into the shaft supporters 37 and 38 which are controlled to be always positioned in parallel relation at the same angular position by the operation shaft 39. As a result, the fork receivers 35 and 36 are synchronized with each other so that they can be always positioned in the same angular interval from the horizontal position. The operation shaft 39 is also inserted into a transmission ring 40 which can be turned about the operation shaft 39.

A pair of shaft supporters 41 and 42 are positioned in front of the shaft supporters 30 and 31 (left side in FIG. 2) and fixed to the lower surface of the chassis 18 in a given spacing, and a supporting shaft 43 is inserted into the shaft supporters 41 and 42 and is positioned to be parallel with the shaft 32. A base of a fluid pressure (i.e. hydraulic) cylinder 44 is coupled to the center of the supporting shaft 43 so as to be turned about the supporting shaft 43. The transmission ring 40 is coupled to a tip end of a piston rod 45 which is extended from or contracted into the hydraulic cylinder 44.

A link mechanism is formed at the lower surface of the chassis 18 of the truck 11 by the supporting shaft 43, hydraulic cylinder 44, piston rod 45, operation shaft 39, fork receivers 35 and 36 and shaft 32, which link mechanism can be turned in an L shape.

A leaf spring 19 (FIG. 4) is fixed to the rear lower surface of the chassis 18 and a drive shaft of the rear wheels 13 is attached to the lower central portion of the leaf spring 19. The shaft supporters 30 and 31 are fixed to the rear end of the chassis 18 and the shaft supporters 41 and 42 are fixed to the chassis 18 in front of the shaft supporters 30 and 31 (left side in FIG. 4). The shaft 32 is inserted into the shaft supporters 30 and 31 and the rotary shaft supporter 33 of the fork receiver 35 is fixed to the shaft 32 so as to be turned about the axis thereof. The supporting shaft 43 is inserted into the shaft supporters 41 and 42 and the base of the hydraulic cylinder 44 is coupled to the supporting shaft 43 so as to be turned about the supporting shaft 43. The shaft supporter 37 is fixed to the lower surface of the fork receiver 35 remote from the shaft supporter 30. The operation shaft 39 is inserted into the shaft supporter 37 and it is coupled to the tip end of the piston rod 45 by way of the transmission ring 40 (omitted in FIG. 4). The arrangement of these elements is as follows. The shaft supporters 30 and 31 and the shaft 32 are arranged at the rear end of the chassis 18, and the shaft supporters 41 and 42 and the supporting shaft 43 are arranged forwardly therefrom, and the operating shaft 39 is position between the shaft 32 and the supporting shaft 43. The axes of the shafts 32, 39 and 43 are parallel with one another.

The operation of the first embodiment will now be described with reference to FIGS. 5, 6 and 7.

As mentioned above, the truck 11 and the fork lift truck 21 are respectively independent transportation vehicles capable of operating individually and they are separated from each other as shown in FIG. 1. Described sequentially hereinafter are a first state where both the truck 11 and fork lift truck 21 are separated from each other, a second state where they are connected to each other so as to load the fork lift truck 21 on the bed of the truck 11, and a third state where the truck 11 travels for a long distance with the fork lift truck 21 loaded on the bed thereof.

In the first state as shown in FIG. 1 where the truck 11 and fork lift truck 21 are separated from each other, the fork lift truck 21 alone is operated while the truck 11 is stopped so as to approach the front side of the fork lift truck 21 toward the rear side of the truck 11. When the fork lift truck 21 conforms to the traveling direction of the truck 11 at the rear portion of the truck 11, both forks 27 and 28 are lifted by the mast 26 (in the direction of an arrow F in FIG. 5) until the forks 27 and 28 reach the height of the fork receivers 35 and 36. Thereafter, the fork 27 is confronted with the insertion hole A of the fork receiver 35 and the fork 28 is confronted with the insertion hole B of the fork receiver 36 and the fork lift truck 21 is advanced in the direction of an arrow G in FIG. 5 while the forks 27 and 28 are kept confronted with insertion holes A and B. As a result, the fork 27 is inserted into the insertion hole A and the fork 28 is inserted into the insertion hole B. FIG. 5 shows the state where the tip ends of the forks 27 and 28 are inserted into the fork receivers 35 and 36.

Successively, the fork lift truck 21 is further advanced so as to insert the forks 27 and 28 full, i.e. the entire lengths thereof, into the insertion holes A and B of the fork receivers 35 and 36. Upon completion of the insertion of the forks 27 and 28 into the insertion holes A and B of the fork receivers 35 and 36, the fork lift truck 21 is stopped. Then, the fork lift truck 21 is operated so as to lower the forks 27 and 28 relative to the mast 26. Since the forks 27 and 28 are inserted and engaged into the fork receivers 35 and 36 which are fixed to the chassis 18 of the truck 11, the position of the fork receivers 35 and 36 is not varied, and hence the height of the forks 27 and 28 held by the fork receivers 35 and 36 is not varied. Accordingly, the chassis 22, i.e. the fork lift truck 21 as a whole, is forced to be lifted in the direction of an arrow H in FIG. 6 by the force to lower the forks 27 and 28. As a result, the fork lift truck 21 is lifted and the front wheels 23 and real wheels 24 are moved upwardly away from the ground and is held in midair as shown in FIG. 6.

Figure 6:
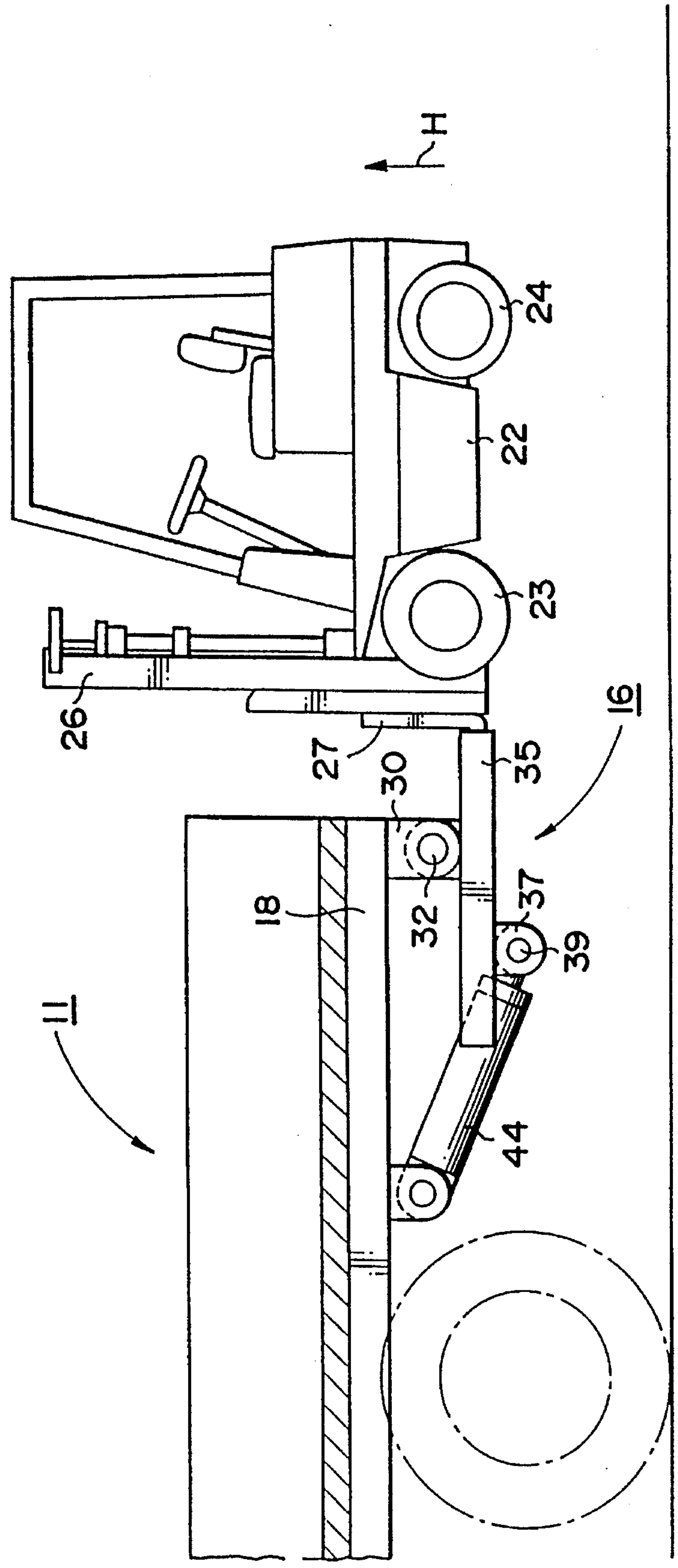
FIG. 6 is a view showing the operation of the fork lift truck loading mechanism of FIG. 1 when the fork lift truck is full connected to the truck and the fork lift truck is lifted into midair.

When the fork lift truck 21 is lifted and the forks 27 and 28 are positioned at the lowest position of the mast 26 as shown in FIG. 6, the operation to lower the forks 27 and 28 is stopped and the fork lift truck 21 is held by the fork receivers 35 and 36 in this state. In this state, a pressure generating device (not shown) accommodated in the truck 11 is operated so as to supply oil under pressure to the hydraulic cylinder 44, whereby the piston rod 45 is pushed out from the hydraulic cylinder 44 and at the same time the piston rod 45 pushes the transmission ring 40 and the operation shaft 39 so as to push the shaft supporters 37 and 38 in the direction of the rear side of the truck 11. Accordingly, the fork receivers 35 and 36 fixed to the shaft supporters 37 and 38 are turned about the shaft 32 in the direction of arrow J in FIG. 7 so that the fork lift truck 21 is turned 90° counterclockwise while the forks 27 and 28 are engaged into and held by the fork receivers 35 and 36.

Figure 7:
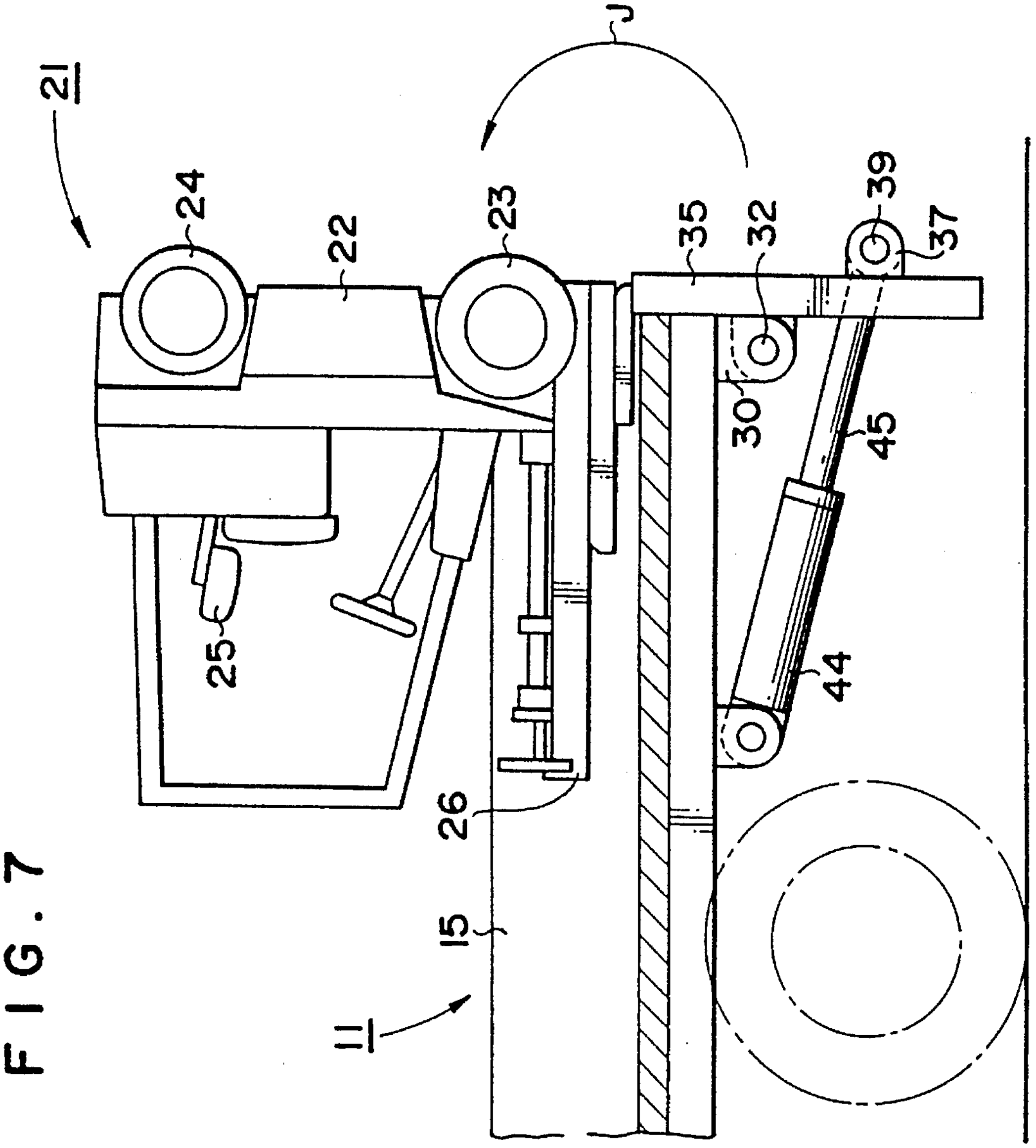
FIG. 7 is a view showing the operation of the fork lift truck loading mechanism of FIG. 1 when the fork lift truck is turned on the truck.

Accordingly, the chassis 22 of the fork lift truck 21 is raised as a whole onto the rear upper surface of the bed 15 of the truck 11 as shown in FIG. 7 whereby the center of gravity of the fork lift truck 21 is positioned on the bed 15 of the truck 11 so that the fork lift truck 21 can be stably loaded on the bed 15. In such a manner, when the fork lift truck 21 is loaded on the bed 15 of the truck 11, the operator can operate the truck 11 in the known manner so as to move the truck 11 from one factory or warehouse to another factory or warehouse while maintaining the fork lift truck 21 loaded on the bed 15 of the truck 11. In case of carrying the fork lift truck 21, the fork lift truck 21 is turned as shown in FIG. 7 so as to raise the chassis 22 substantially vertical relative to the bed 15 of the truck 11. However, since the fork lift truck 21 employs a sealed battery as the power source, there is no likelihood of leakage of liquid or fuel.

Figure 5:
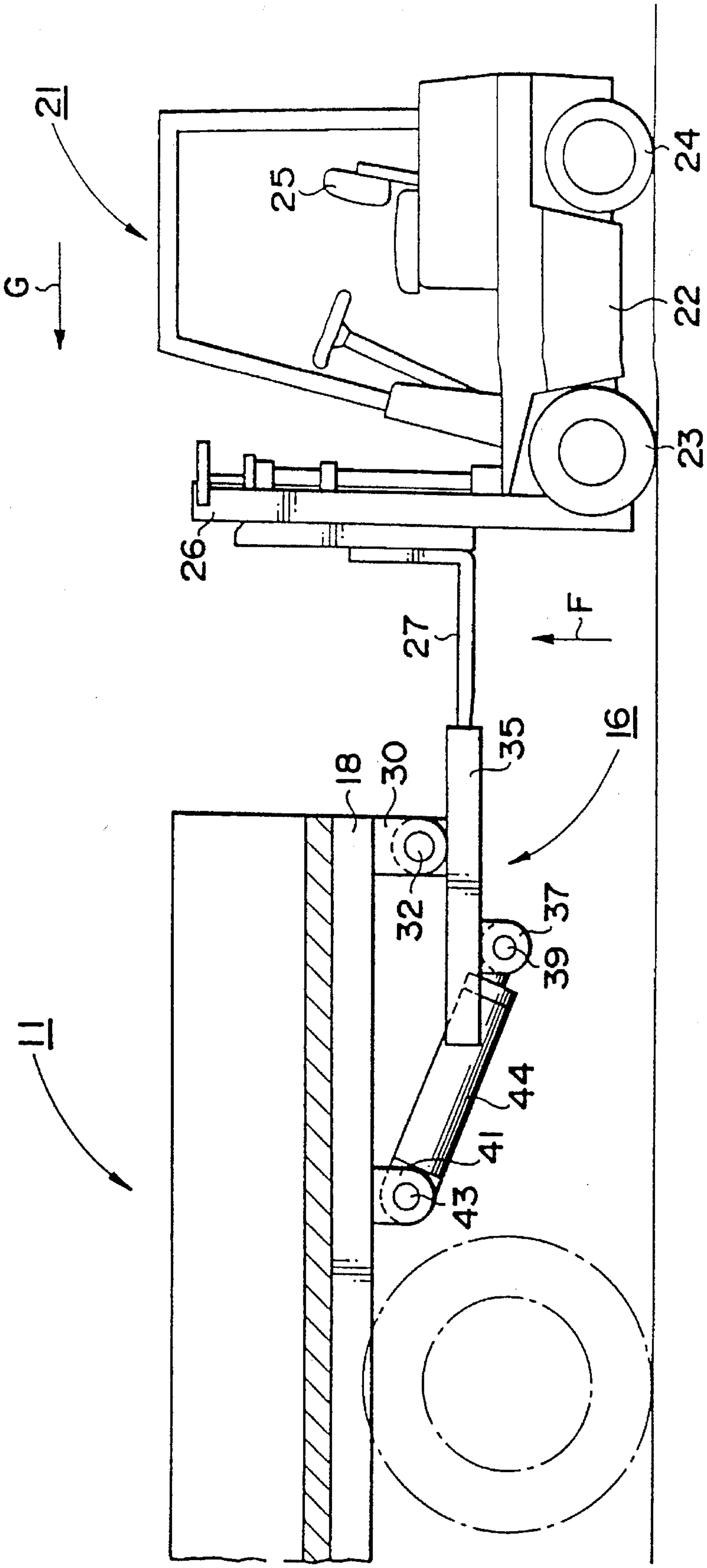
FIG. 5 is a view showing the operation of the fork lift truck loading mechanism of FIG. 1 when the fork lift truck is just connected to the truck.

Contrary to the aforementioned operations, namely, when the operator drives the truck 11 on a public road and thereafter unloads the fork lift truck 21 from the bed 15 of the truck 11 after arrival at the destination, the operator performs the operations in the order of FIG. 7, FIG. 6 and FIG. 5. When unloading the fork lift truck 21, one operator can operate the truck 11 and fork lift truck 21 alternately without needing an assistant operator. Contrary to the procedures as mentioned above, the truck 11 and the fork lift truck 21 can perform their own functions after unloading the fork lift truck 21 from the bed 15 of the truck 11. As a result, the operator can unload the cargo or pallet which is loaded on the bed of the truck in a short time or load the cargo or pallet on the bed 15 of the truck 11 using the fork lift truck 21.

Figure 8:
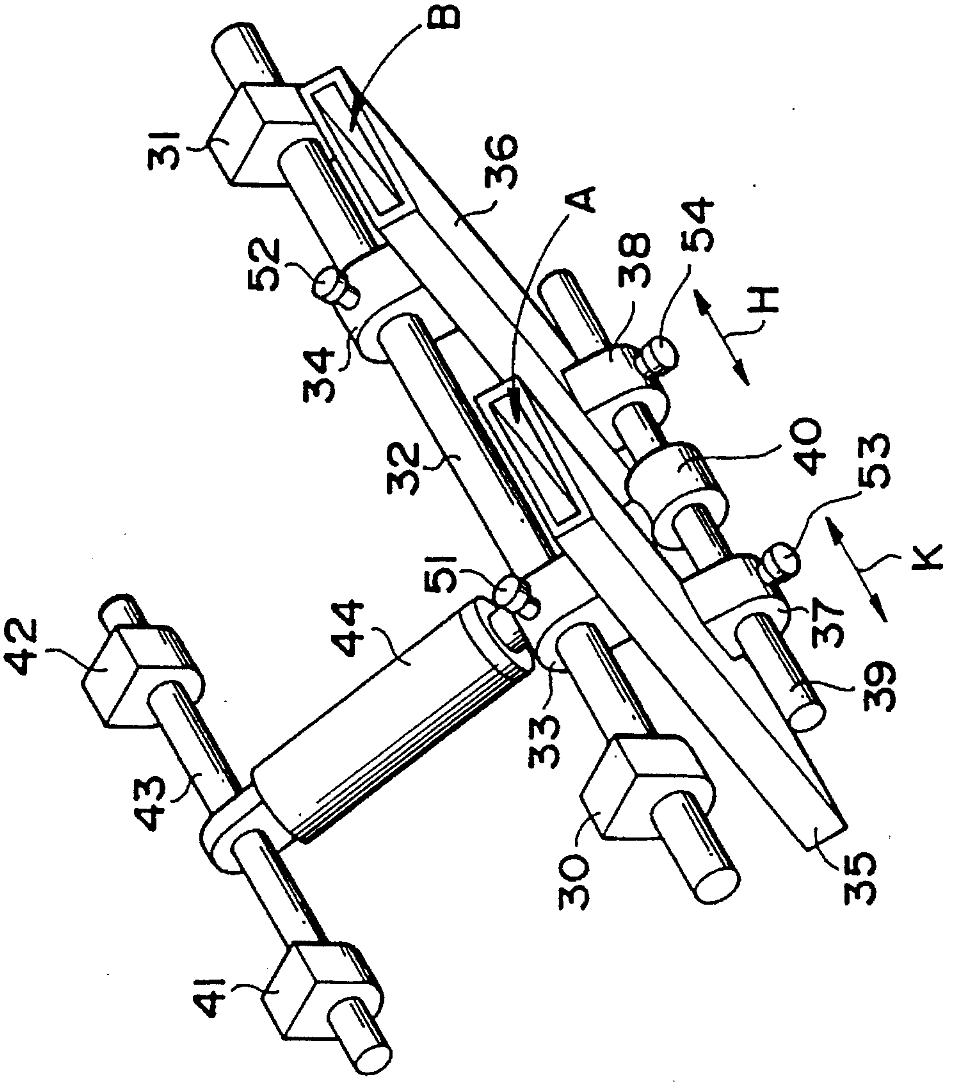
FIG. 8 is a perspective view of a fork lift truck loading mechanism according to a second embodiment of the invention in which the loading mechanism is removed from the chassis of a truck.

Second Embodiment (FIG. 8)

A fork lift truck loading mechanism according to a second embodiment will be described with reference to FIG. 8. In the second embodiment, elements which are the same as those of the first embodiment in FIG. 2 are denoted by the same numerals and the explanation thereof is omitted.

In the second embodiment, even if the fork lift truck has different standards, the loading mechanism 16 can be adapted to such fork lift truck 21 by adjusting the loading mechanism 16.

The fork lift truck 21 is varied in its standards depending on the manufacturer who manufactures the fork lift truck 21 and the lifting capacity of the fork lift truck 21, and hence there frequently occurs a case in that the distance between the forks 27 and 28 of one fork lift truck is different from that of another fork lift truck. The second embodiment makes it possible to adjust the loading mechanism 16 according to the distance between the forks 27 and 28 so as to fit any type of fork lift truck 21.

According to the second embodiment, the shaft 32 is inserted into the rotary shaft supporters 33 and 34 and the latter are set to be slidable in the longitudinal direction of the shaft 32. Set screws 51 and 52 are respectively screwed into the rotary shaft supporters 33 and 34 for fixing the rotary shaft supporters to the shaft 32. The transmission ring 40 is fixed to the center of the operation shaft 39 which is slidably inserted into the shaft supporters 37 and 38 which are positioned at the left and right thereof. Set screws 53 and 54 are respectively screwed into the shaft supporters 37 and 38 for fixing the shaft supporters to the operation shaft 39.

With this second embodiment, when the distance between the fork receivers 35 and 36 is varied, each of the set screws 51, 52, 53 and 54 is loosened and the rotary shaft supporter 33 and shaft supporter 37 are moved in the longitudinal direction of the shaft 32 and operation shaft 39 so that the fork receiver 35 is movable to the left and right, and the rotary shaft supporter 34 and shaft supporter 38 are movable in the longitudinal direction of the shaft 32 and operation shaft 39 so that the fork receiver 36 is movable to the left and right. When both fork receivers 35 and 36 are moved and the distance therebetween conforms to that of the forks 27 and 28, each of the set screws is screwed so that the rotary shaft supporters 33 and 34 are fixed to the shaft 32 and the shaft supporters 37 and 38 are fixed to the operation shaft 39.

As mentioned above, since the fork receivers 35 and 36 are freely movable in the directions of arrows K and H in FIG. 8 and can be fixed to the adjusted positions, the distance between the fork receivers 35 and 36 can be varied. Since the distance between the fork receivers 35 and 36 can be varied, it is possible to easily adjust the fork receivers 35 and 36 to accommodate the distance between the forks 27 and 28 of the fork lift truck 21.

With the arrangement of the inventions, in case of loading the fork lift truck on the bed of a truck, a single operator can load the fork lift truck 21 on the bed of the truck without using a working machine such as a crane, etc. The loading operation can be accomplished easily and quickly by a single operator.

Third Embodiment (FIGS. 9 to 21)

A fork lift truck loading mechanism according to a third embodiment will now be described with reference to FIGS. 9 to 21. Elements which are the same as those of the first and second embodiments are denoted by the same reference numbers increased by "100" so as to differentiate them from one another, and the explanation thereof is omitted.

The principal structure of the fork lift truck loading mechanism 116 of the third embodiment is the same as those of the first and second embodiments. That is, it comprises a movable truck 111, a holding means which is supported by a chassis 118 of the truck 111 so as to be movable horizontally and turned from a substantially horizontal position to a substantially perpendicular position so as to hold forks 127 and 128 of the fork lift truck 121, and rotary means interposed between the truck 111 and the holding means for turning the fork lift truck 121.

However, the third embodiment further includes a pair of supporting means for fixing the truck 111 temporarily to the ground in case of loading the fork lift truck 121 on the bed 115 of the truck 111, which comprises a pair of left and right hydraulic jack type supporting legs 156 and 157, described below.

Figure 10:
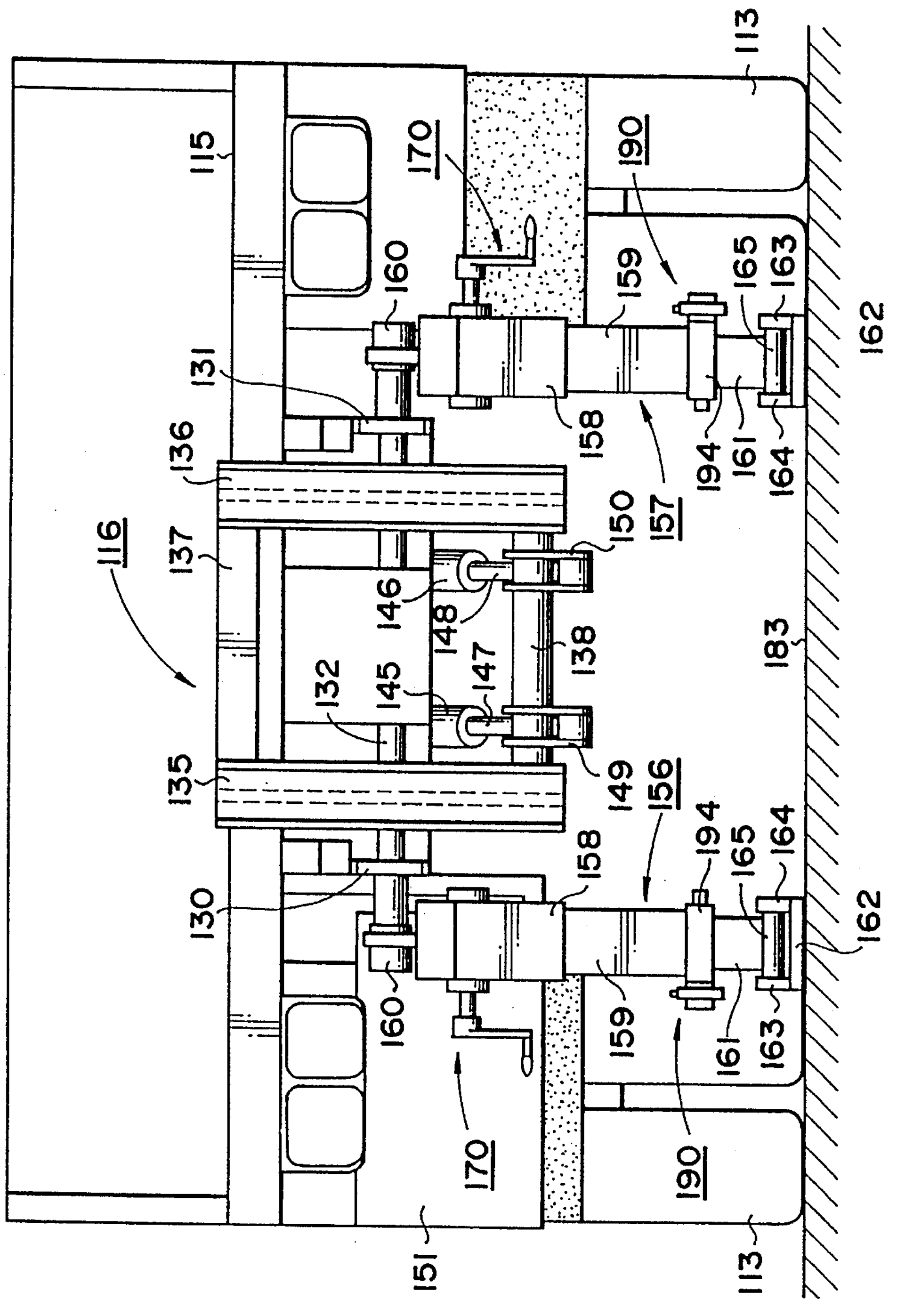
FIG. 10 is an arrangement of the fork lift truck loading mechanism of FIG. 9 which is viewed from the rear portion of the truck for explaining the fork lift truck loading mechanism of FIG. 9.
Figure 11:
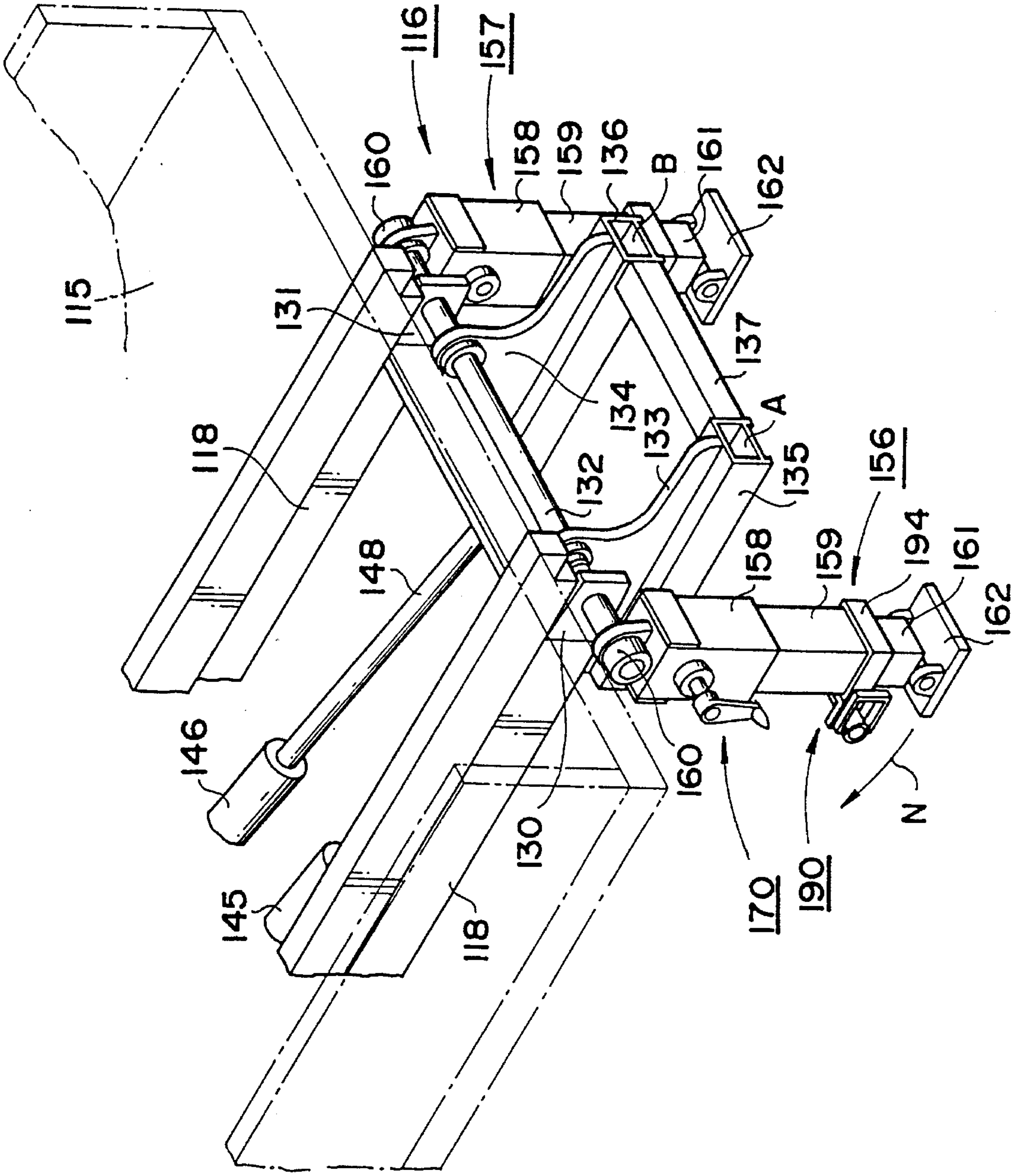
FIG. 11 is a perspective view of the fork lift truck loading mechanism of FIG. 9 which is removed from the chassis of a truck.
Figure 12:
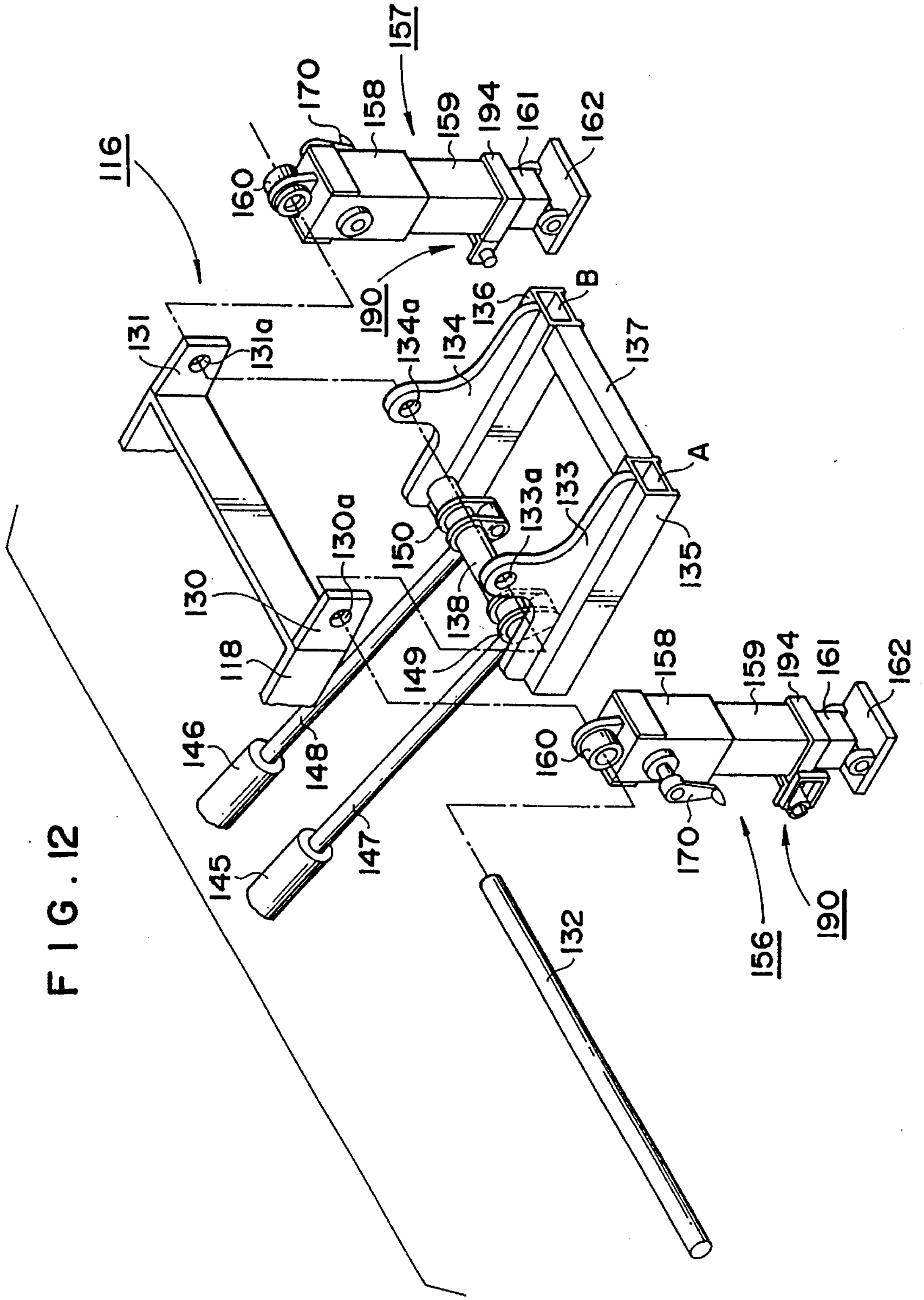
FIG. 12 is an exploded perspective view of the fork lift truck loading mechanism of FIG. 9.

As shown in FIGS. 10 to 12, the loading mechanism 116 includes a pair of shaft supporters 130 and 131 which are fixed to the chassis 118 in a given spacing at the rear end thereof and at the left and right sides thereof. A shaft 132 is inserted into supporting holes 130*a* and 131*a*, which are defined on the shaft supporters 130 and 131, and the axis of the shaft 132 is arranged perpendicular to the traveling direction of the truck 111. The shaft 132 is inserted into a pair of rotary shaft supporters 133 and 134 by way of shaft supporter holes 133*a* and 134*a* respectively so that the rotary shaft supporters 133 and 134 are turnable about the shaft 132. The rotary shaft supporters 133 and 134 are respectively formed of thick plates and have substantially convex shapes and are positioned between the shaft supporters 130 and 131. The upper surfaces of the fork receivers 135 and 136, which serve as holding means for the forks 127 and 128, are fixed by welding, etc. to the flat lower end portions of the rotary shaft supporters 133 and 134.

The fork receivers 135 and 136 are formed, e.g. by welding or bending steel sheet or plate. The fork receivers 135 and 136 are arranged in parallel with each other in the longitudinal direction of the truck 111 and they are hollow inside and are rectangular in cross section. Insertion holes A and B are respectively formed in the longitudinal direction of the fork receivers 135 and 136 and open rearwardly.

A coupling rod 137 formed of a single square pipe is fixedly coupled by welding, etc. to both rear ends of the fork receivers 135 and 136 (in the direction of the rear portion of the truck 111) in the manner that it is inserted between the confronted fork receivers 135 and 136 in a crossing state at the rear ends thereof. A single coupling shaft 138 is fixedly connected by welding, etc. to both confronted front ends of the fork receivers 135 and 136 (in the direction of the front portion of the truck 111). With such an arrangement, the fork receivers 135 and 136, coupling rod 137 and coupling shaft 138 form a square frame having both fixed ends, and this frame mechanism is held so as to be vertically turned about the axis of shaft 132 from a substantially horizontal position to a forward inclined position exceeding (i.e. moving through) a substantially perpendicular position at the rear portion of the bed 115 of the truck 111. The interval between the fork receivers 135 and 136 is set to correspond to the interval between the forks 127 and 128 of the fork lift truck 121.

A pair of hydraulic cylinders 145 and 146 are coupled to the coupling shaft 138 as a rotary means for turning the fork receivers 135 and 136. The bases of the hydraulic cylinders 145 and 146 are supported by the chassis 118 by way of horizontal supporting pins (not shown) so as to be swingable in the vertical direction and they are disposed aligned and parallel with each other toward the rear portion of the truck 111. Piston rods 147 and 148 are projected from rear ends of the hydraulic cylinders 145 and 146 so as to be extended from or contracted into the hydraulic cylinders 145 and 146. A pair of coupling arms 149 and 150 are fixed to the coupling shaft 138 in a given interval so as to be turned about the coupling shaft 138. The interval between the coupling arms 149 and 150 is set to be the same as that of the piston rods 147 and 148. Tip ends of the piston rods 147 and 148 are coupled to the coupling arms 149 and 150 by way of pins so as to be turned about the coupling shaft 138.

Oil under pressure is synchronously supplied to each of the hydraulic cylinders 145 and 146 in the same direction when operating a control box 151 which is disposed under the bed 115 of the truck 111. As a result, the piston rods 147 and 148 which are operated at the same time push the coupling shaft 138 or pull the coupling shaft 138 by way of the coupling arms 149 and 150, whereby the fork receivers 135 and 136 are turned about the shaft 132 from the substantially horizontal position to a forward inclined position (which turning movement exceeds 90°).

As a supporting means for fixing the truck 111 temporarily to the ground in case of loading the fork lift truck 121 onto the truck bed 115, there are provided a pair of left and right jack type supporting legs 156 and 157 which can be hydraulic and can be extended and contracted vertically as shown in FIGS. 10 to 12. The supporting legs 156 and 157 are respectively disposed outside the fork receivers 135 and 136 and the upper ends thereof are supported by the shaft 132 and they can be turned about the shaft 132 as a fulcrum.

FIGS. 13 to 16 are views explaining the arrangement of the supporting legs 156 and 157 in detail. The supporting legs 156 and 157 are arranged symmetrically bilaterally, i.e. horizontally sidewardly relative to the bed 115 of the truck 111. Since the structures of both supporting legs 156 and 157 are the same, the supporting leg 156 as disposed at the left side of the truck 111 is typically illustrated in and explained with reference to FIGS. 13 to 16.

Figure 13:
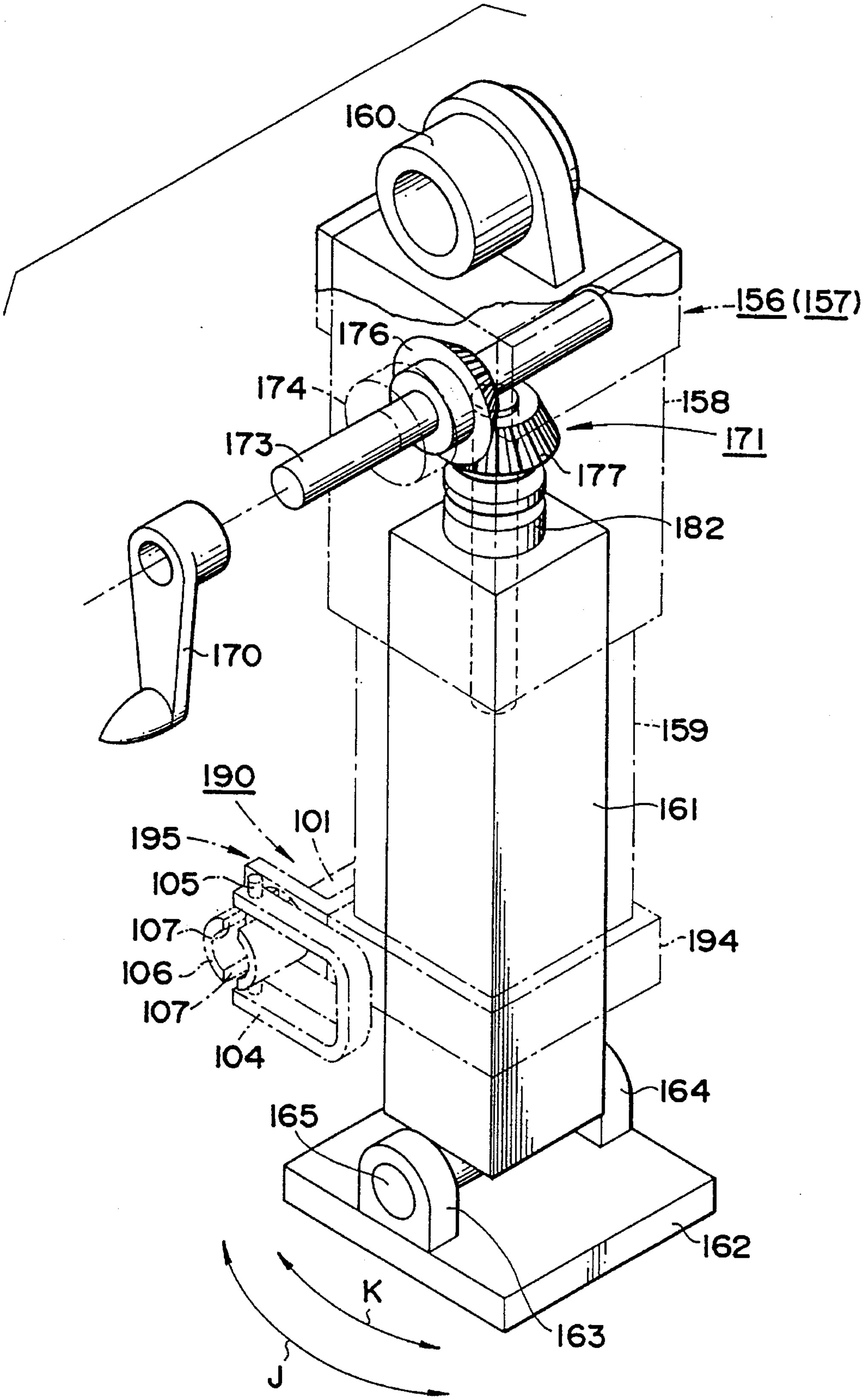
FIG. 13 is an enlarged perspective view of supporting legs for explaining the fork lift truck loading mechanism of FIG. 9.
Figure 14:
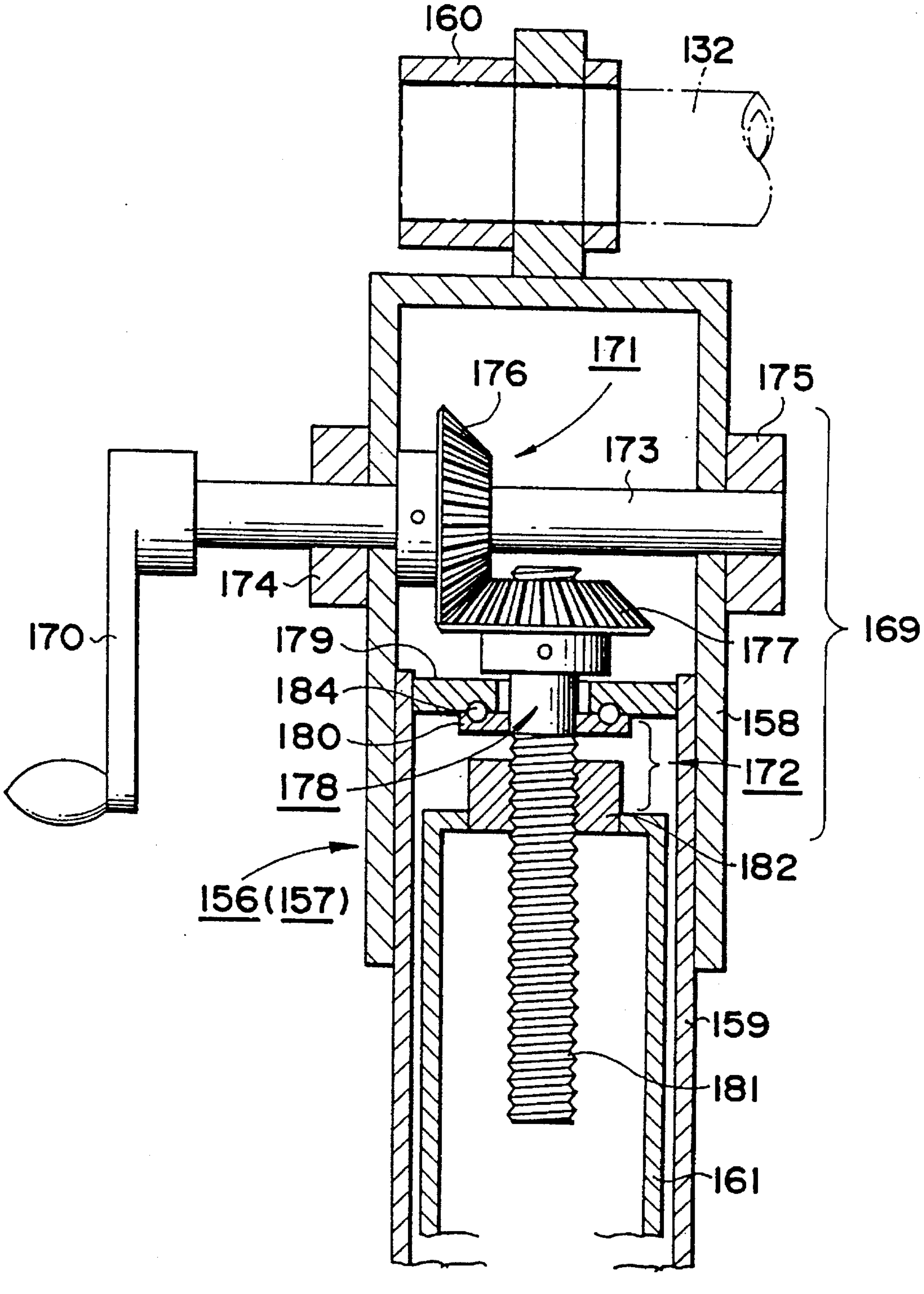
FIG. 14 is an enlarged cross sectional view of the supporting legs for explaining the fork lift truck loading mechanism of FIG. 9.

FIG. 13 is a view showing the entire arrangement of the supporting leg 156. The supporting leg 156 comprises an upper leg part 158 which is formed as a hollow square pillar and is closed at the upper end thereof and is large in cross sectional area and a lower leg part 159 which is fixed to the inner surface of the lower end of the upper leg part 158 and which is also formed as a hollow square pillar and is opened at the upper and lower ends thereof and is slightly smaller than that of the upper leg part 158 in cross sectional area. A cylindrical fulcrum supporter 160 is fixed on the closed upper end of the upper leg part 158 so as to protrude upwardly therefrom. The upper leg part 158, and hence the entire of the supporting leg 156, is supported by the end of the shaft 132 by way of the fulcrum supporter 160 so as to be turnable about the shaft 132.

A movable leg 161 which is formed as a hollow square pillar and is small in cross sectional area is slidably vertically engaged in the inner periphery of the lower leg part 159. A square base plate 162 is attached to the lower end of the movable leg 161 so as to contact the ground and it is swingable in the same direction as the turning direction of the supporting leg 156 (in the direction of arrow J). That is, a pair of shaft supporting lugs 163 and 164 are provided on the upper surface of the base plate 162 and protrude upwardly and define a center of an axis which is parallel with the fulcrum supporter 160. A supporting pin 165 attached to the lower end of the movable leg 161 is coupled to the shaft supporting lugs 163 and 164 so as to be turnable about the supporting pin 165. The base plate 162 can thus be swung in the same direction (in the direction of arrow K) as the turning direction (arrow J) of the supporting leg 156.

The movable leg 161 can be vertically movable by a manual driving mechanism 169 (FIG. 14) comprising a handle 170, gear mechanism 171 and ball nut mechanism 172 in the manner that it projects from the lower portion of the lower leg 159. A retaining means 190 (FIG. 15) is provided at the lower end of the lower leg 159 for detachably holding the supporting leg 156 at a given position on the chassis 118 when the supporting leg 156 is not in use as described hereinafter.

The manual driving mechanism 169 includes an input shaft 173 rotatably supported in parallel with the shaft 132 by shaft supporters 174 and 175 which are fixed on opposite sidewalls of the upper leg 158. The angled handle 170, which is bent 90° relative to the axis of the input shaft 173 and is rotatable manually, is attached to one end of the input shaft 173. A bevel gear 176 serving as an input gear of the gear mechanism 171 is fixed to the input shaft 173 inside the upper leg 158, and a bevel gear 177 serving an an output gear meshes with the bevel gear 176 while crossing 90° relative to the axis of the bevel gear 176.

An upper end of a ball screw 178 serving as an output shaft constituting the ball nut mechanism 172 is fixed to the bevel gear 177. The bevel gear 177 and ball screw 178 are assembled so as to be turned together. The ball screw 178 penetrates an opening defined at the center of a flange 179 provided at the upper end of the lower leg 159 and extends downward. A circular bearing plate 180 having a large diameter is fixed to the ball screw 178 at a middle portion thereof. The bearing plate 180 is positioned under the flange 179. A ball bearing 184 is interposed between the bearing plate 180 and flange 179 and the ball screw 178 is rotatably supported by the bearing plate 180. The ball screw 178 has a spiral groove 181 which extends downward from the lower portion of the bearing plate 180. The ball screw 178 is screwed into a ball nut 182 which is fixedly mounted on the upper end of the movable leg 161. When the handle 170 is turned, the ball screw 178 serving as the output shaft is turned by way of the bevel gears 176 and 177. As a result, the ball nut 182 acting through the groove 181 is screwed, and hence the movable leg 161 can be telescopically extended or contracted relative to the lower leg 159. In such a manner, the entire length of the supporting leg 156 can be extended or contracted so that both ends of the shaft 132 of the fork receivers 135 and 136 can be supported on the ground 183 (FIG. 10) by the left and right supporting legs 156 and 157.

Figure 15:
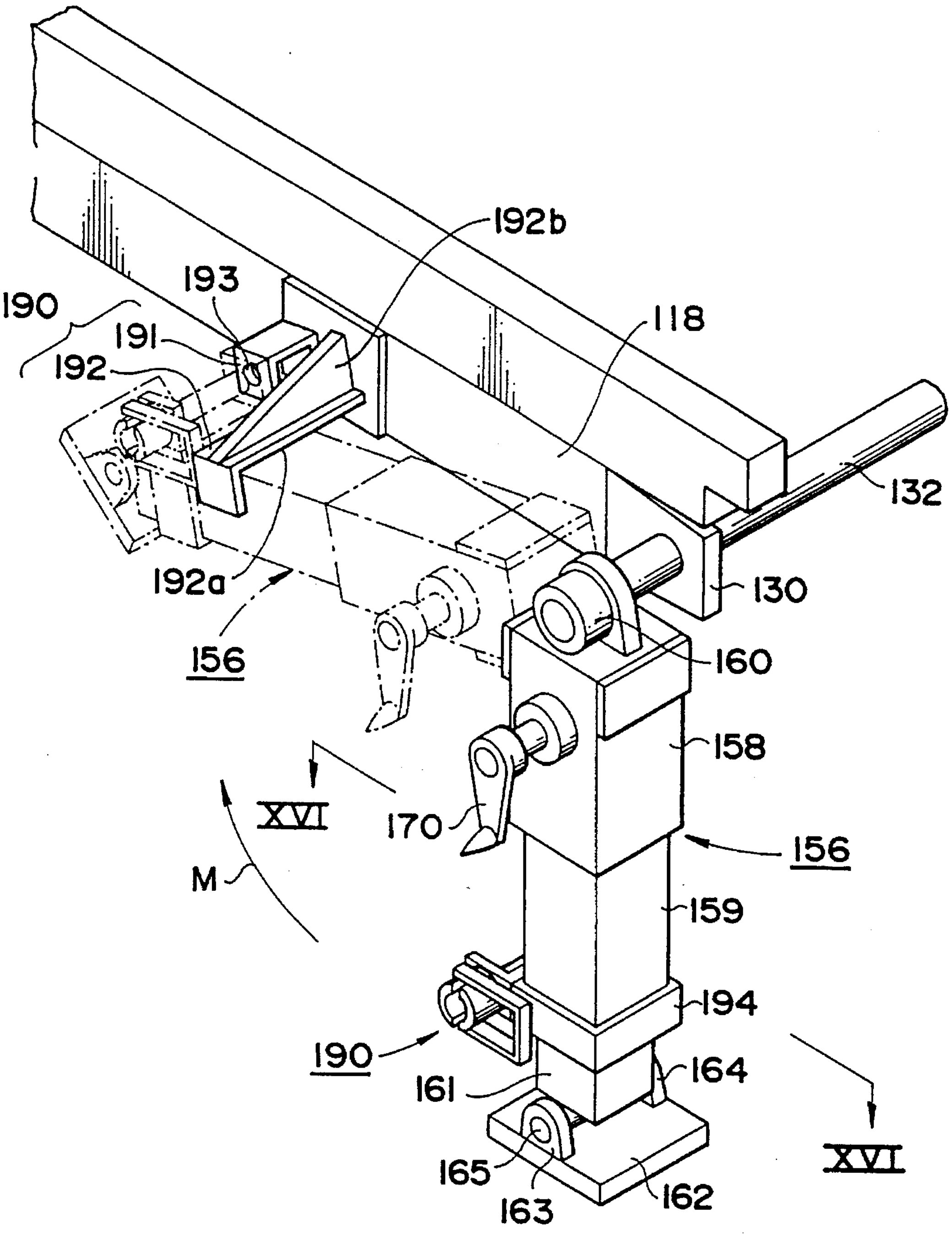
FIG. 15 is a perspective view showing the state of holding the supporting legs for explaining the fork lift truck loading mechanism of FIG. 9.

FIG. 15 is a perspective view showing the state where the lower end of the supporting leg 156 is supported on the ground 183 as denoted by solid lines. When the supporting leg 156 is not being used, the supporting leg 156 is turned forwardly about the shaft 132 (in the direction of arrow M) into the dotted line position of FIG. 15. In this unused or storage state of the supporting leg 156, the lower or free end of the supporting leg 156 (i.e. the tip end) can be held by the chassis 118 by way of the retaining means 190. This means 190 includes a retainer body 191 and a presser member 192 for engaging the upper side of the supporting leg 156. The retainer body 191 is generally cylindrical and is opened at the tip end thereof. The retainer body 191 is fixed to and protrudes sidewardly from the side surface of the chassis 118, and an opening 193 therein serves as an insertion hole of a retaining pin 101, described later. The presser member 192 includes a body portion 192*a* which is of a downwardly opening U shape, and a supporting rib portion 192*b* for supporting the body portion 192*a* from the upper side thereof. The member 192 is positioned at the rear side of the retainer body 191 and is fixed to and protrudes sidewardly from the surface of the chassis 118.

Figure 16:
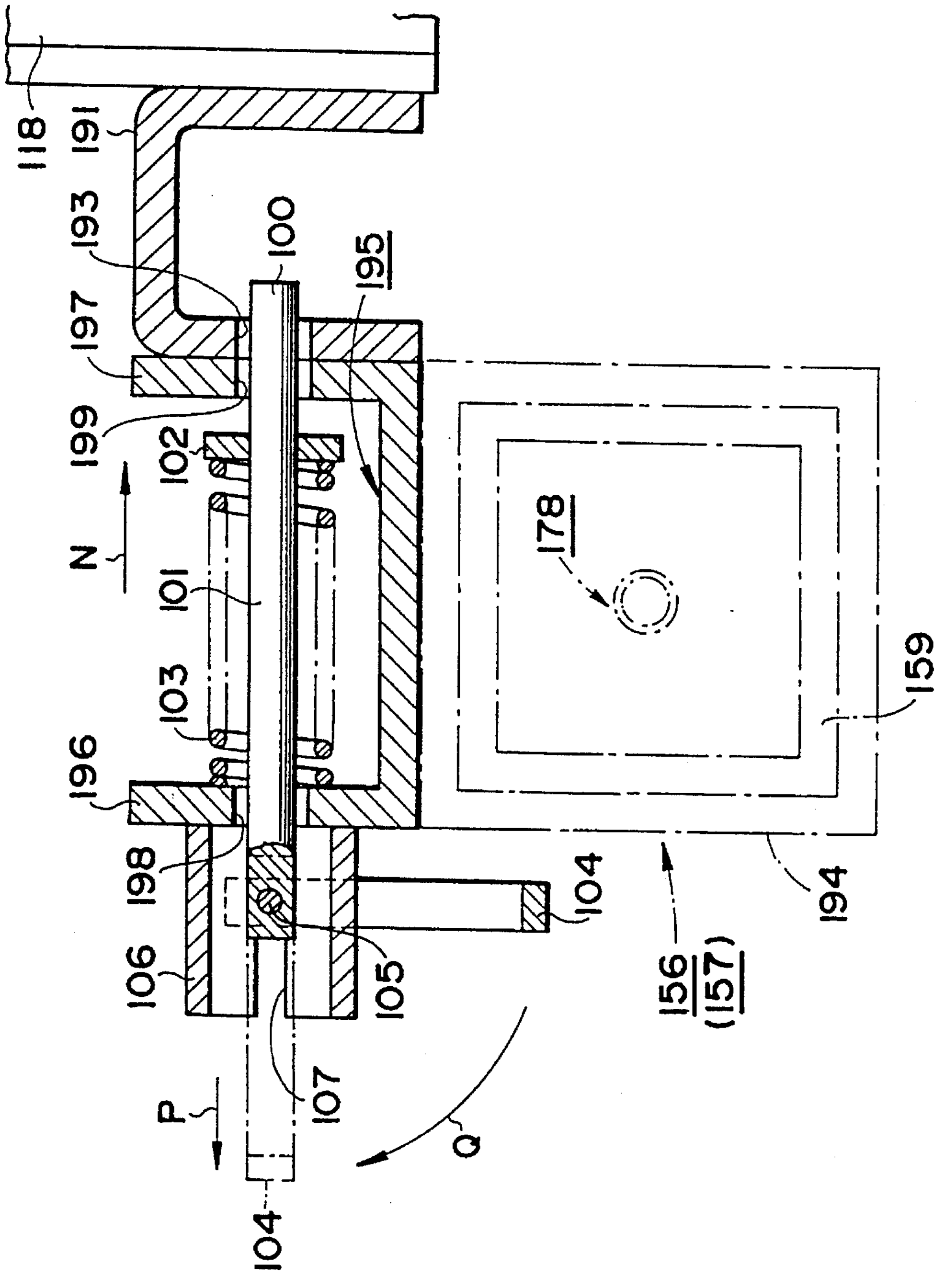
FIG. 16 is an enlarged cross sectional view of a holding means for holding the supporting legs for explaining the fork lift truck loading mechanism of FIG. 9.

FIG. 16 is an enlarged cross-sectional view of the retaining means 190 provided on the supporting leg 156 and taken along line XVI—XVI in FIG. 15. The retaining means 190 includes an attaching ring or frame 194 which is fixed by welding, etc. to the lower end of the lower leg 159 in surrounding relation thereto, a U-shaped supporting frame 195 which is integrated by welding, etc. with one side of the attaching frame 194, and the retaining pin 101 which penetrates aligned holes 198 and 199 of confronting side legs 196 and 197 of the supporting frame 195. One end 100 of the retaining pin 101 is pulled in or pulled out from the opening 193 formed in the retainer body 191.

A collar 102 is fixed to an outer periphery of the retaining pin 101 at the position close to the tip end 100 thereof, and a spring 103 (i.e. a compression coil spring) is interposed between the collar 102 and the side leg 196. The retaining pin 101 is urged in the direction to protrude the tip end 100 thereof (in the direction of arrow N in FIG. 16) so as to be inserted into the opening 193 of the retainer body 191 attached to the chassis 118. A square ring-shaped tension operation device 104 (i.e. a handle) is pivotally attached to the other end of the retaining pin 101 by way of an attaching pin 105 for pulling the tension operation device 104 in the direction of arrow P against the resiliency of the spring 103.

The handle 104 is normally held so as to not protrude in the axial direction of the retaining pin 101 as shown in solid lines in FIG. 16. When loading or unloading the fork lift truck 121 on the bed 115 of the truck 111, the handle 104 is turned 90° about the attaching pin 105 in the direction of arrow Q in FIG. 16 so as to protrude in the axial direction of the retaining pin 101. Thereafter, the handle 104 is pulled in the direction of arrow P so that the tip end 100 of the retaining pin 101 can be pulled out from the opening 193 of the retainer body 191.

A split tubular holding cylinder 106 is integrated with the supporting frame 195 and protrudes outwardly so as to hold the handle 104. The holding cylinder 106 has a pair of slit-shaped guide grooves 107 serving as a movable guide for the attaching pin 105. The guide groove 107 has a given length and functions as a stopper when the spring 103 moves the pin 101 in the protruding direction (in the direction of arrow N) when held by the attaching pin 105 at the bottom thereof.

Figure 17:
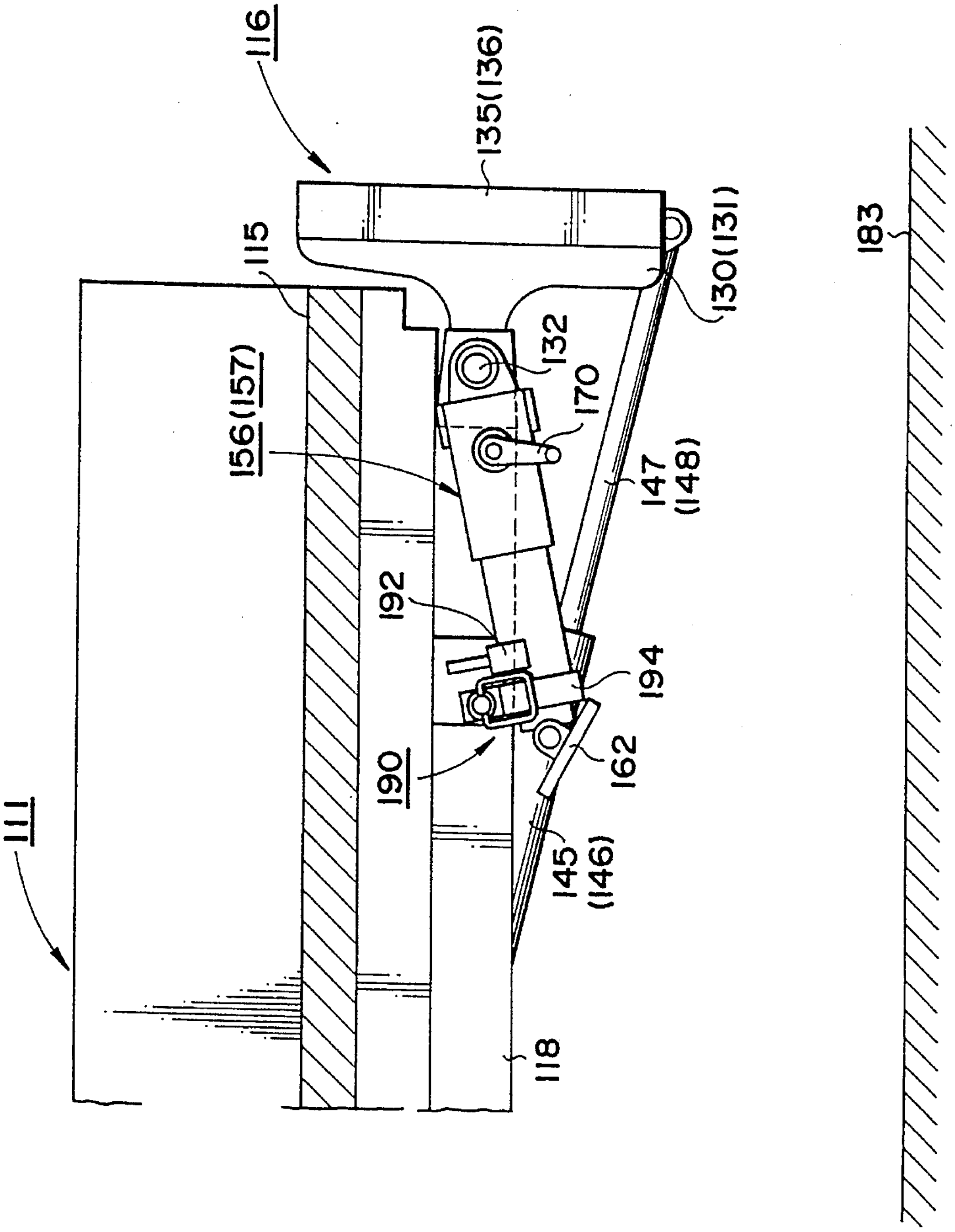
FIG. 17 is a view showing the operation of the fork lift truck loading mechanism of FIG. 9 when the supporting legs are supported by the truck.

FIG. 17 shows the storage for supporting legs 156 and 157 during the traveling of the truck 111. As shown, the supporting legs 156 and 157 are turned about the shaft 132 to extend forwardly along the chassis 118 and they are held by the retaining means 190.

Figure 18:
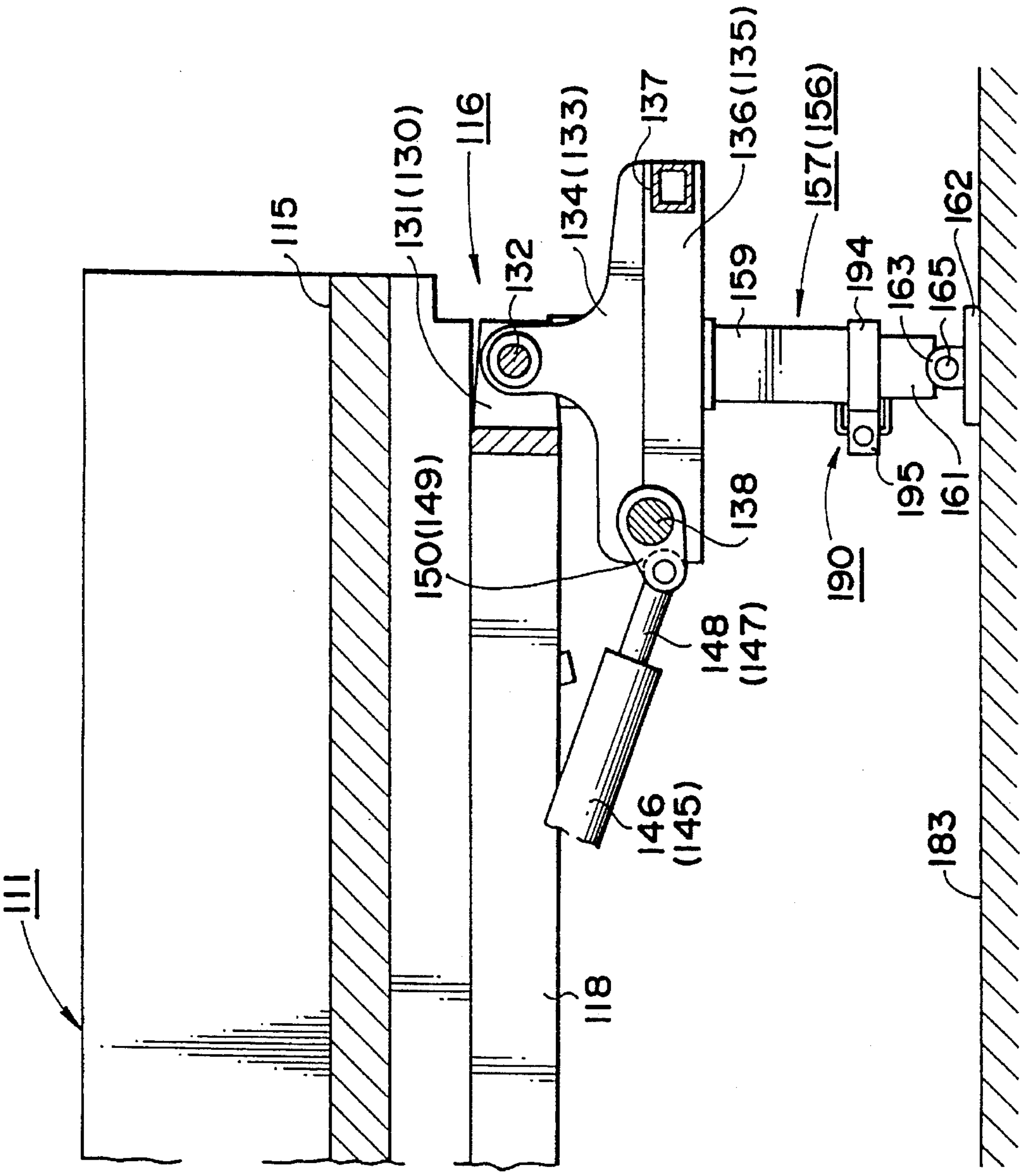
FIG. 18 is a view showing the operation of the fork lift truck loading mechanism of FIG. 9 when the supporting legs are supported on the fork lift truck which is connected to the truck.

FIG. 18 shows the state where the supporting legs 156 and 157 are extended vertically in case of loading the fork lift truck 121 onto the truck bed 115. As shown, the retaining means 190 releases the supporting legs 156 and 157 from the chassis 118 so that the supporting legs 156 and 157 are turned downwardly about the shaft 132, whereby the supporting legs 156 and 157 are changed from the state where they are supported by the chassis 118 to the state where they project vertically for engagement with the ground.

The operation of the loading mechanism 116 of the third embodiment will now be described with reference to FIGS. 19, 20 and 21.

Figure 9:
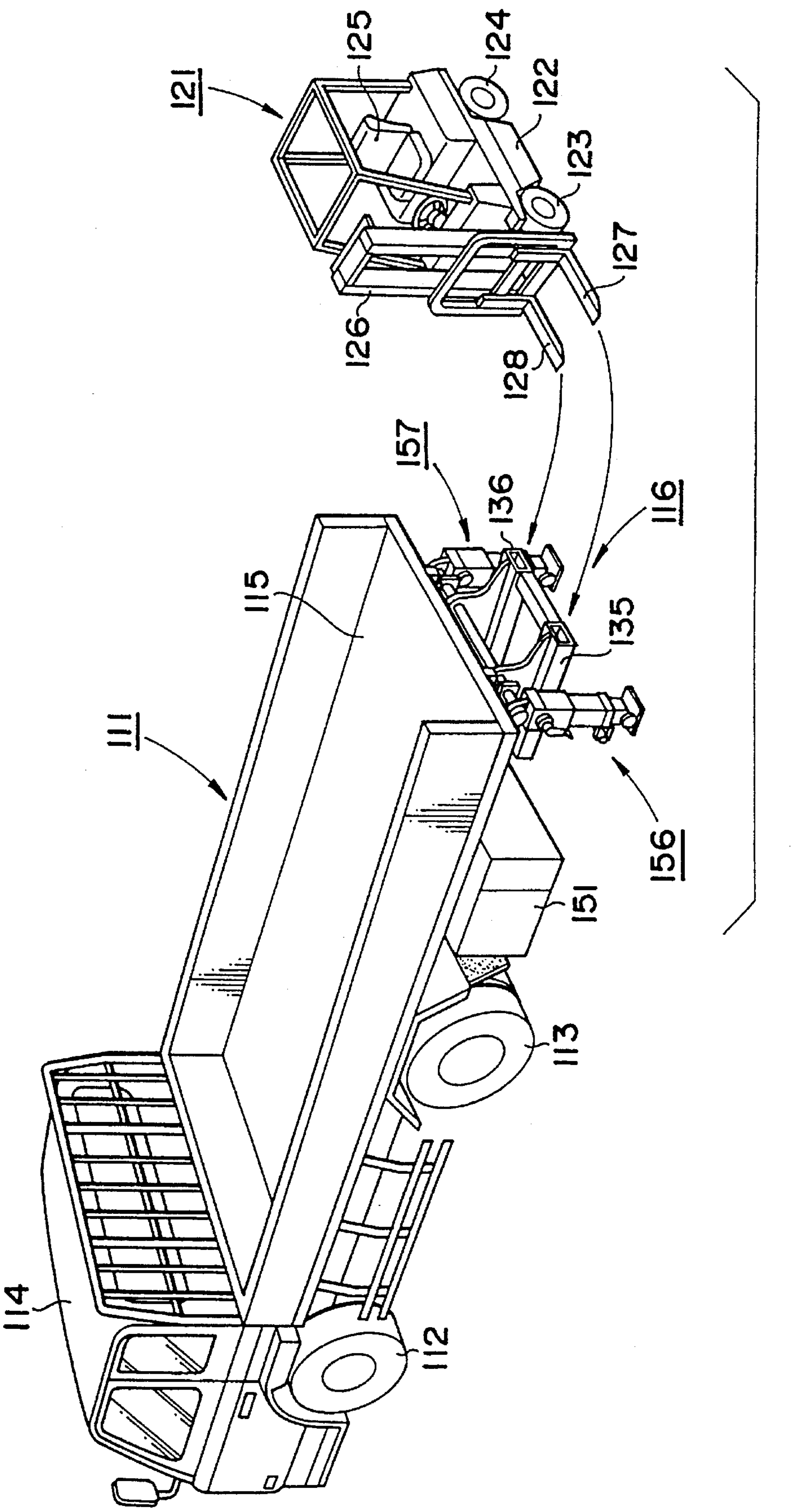
FIG. 9 is an overall external view of a truck having a fork lift truck loading mechanism and a fork lift truck according to a third embodiment of the present invention.

As mentioned above, the truck 111 and the fork lift truck 121 are respectively independent transportation means capable of operating individually and are normally separated from each other as shown in FIG. 9. Described sequentially hereinafter are a first state where both the truck 111 and fork lift truck 121 are separated from each other, a second state where they are connected to each other so as to load the fork lift truck 121 on the bed of the truck 111, and a third state where the truck 111 travels for a long distance with the fork lift truck 121 loaded on the bed thereof.

In the first state as shown in FIG. 9 where the truck 111 and fork lift truck 121 are separated from each other, the fork lift truck 121 alone is operated so as to approach the front side of the fork lift truck 121 to the rear side of the truck 111. When the fork lift truck 121 conforms to the traveling direction of the truck 111, both forks 127 and 128 are lifted by the mast 126 until the forks 127 and 128 reach the height of the fork receivers 135 and 136.

Figure 19:
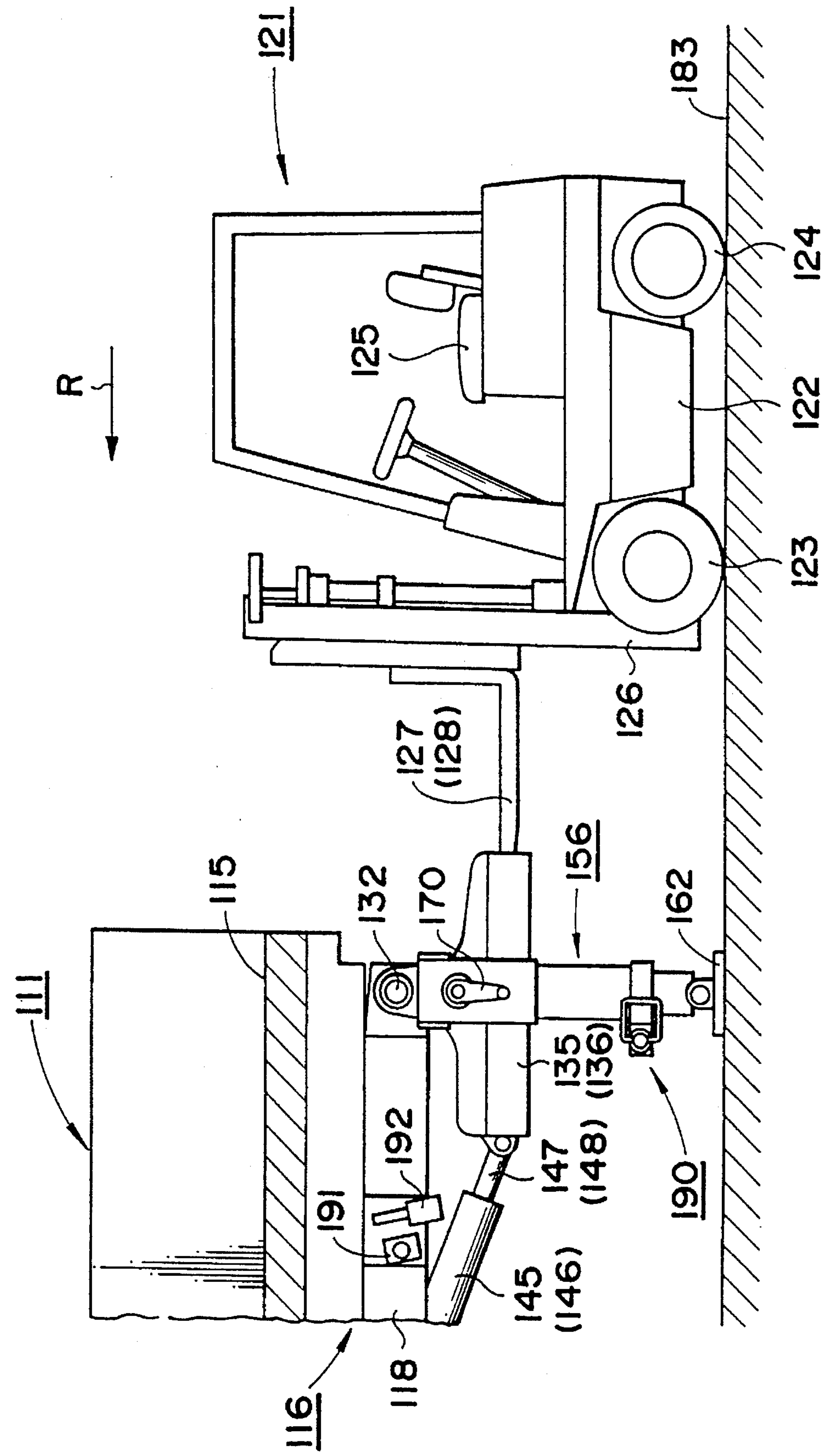
FIG. 19 is a view showing the operation of the fork lift truck loading mechanism of FIG. 9 when the fork lift truck is just connected to the truck.

Thereafter, the fork 127 is confronted with the insertion hole A of the fork receiver 135 and the fork 128 is confronted with the insertion hole B of the fork receiver 136 and the fork lift truck 121 is advanced in the direction of arrow R in FIG. 19. As a result, forks 127 and 128 are inserted into the insertion holes A and B. FIG. 19 shows the state where the tip ends of the forks 127 and 128 are inserted into the fork receivers 135 and 136.

Successively, the fork lift truck 121 is further advanced so as to insert the forks 127 and 128 fully, i.e. the entire lengths thereof, into the insertion holes A and B of the fork receivers 135 and 136. Upon completion of the insertion of the forks 127 and 128 into the insertion holes A and B, the advancement of the fork lift truck 121 is stopped. Then, the fork lift truck 121 is operated so as to lower the forks 127 and 128 relative to the mast 126.

Since the forks 127 and 128 are inserted and engaged into the fork receivers 135 and 136 which are fixed to the chassis 118 of the truck 111, the height position of the fork receivers 135 and 136 is not varied. Accordingly, the chassis 122, i.e. the fork lift truck 121 as a whole, is lifted in the direction of arrow S in FIG. 20 by the driving force trying to lower the forks 127 and 128. As a result, the fork lift truck 121 is lifted and the front wheels 123 and rear wheels 124 are moved upwardly away from the ground and are held in midair as shown in FIG. 20.

Figure 20:
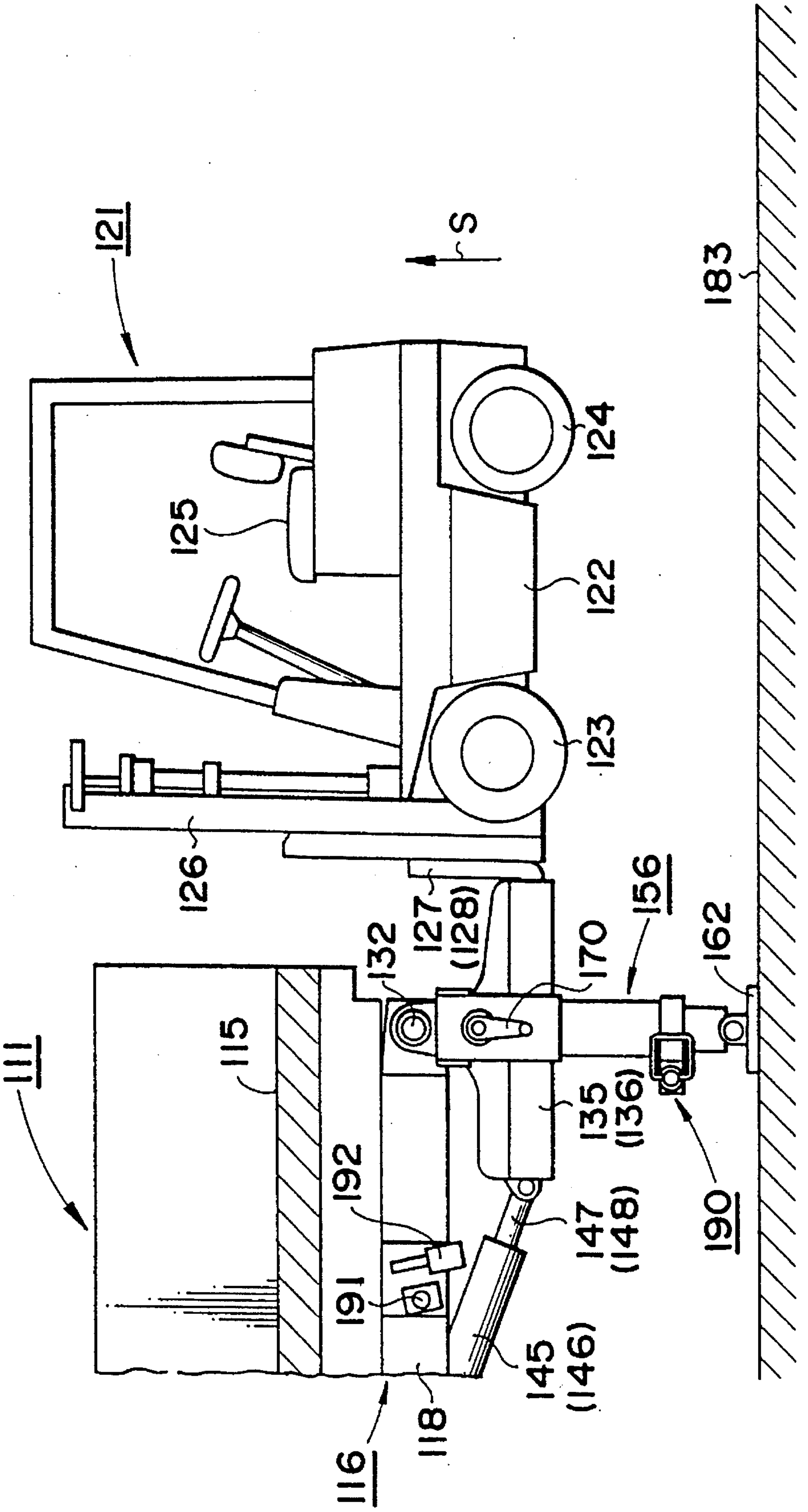
FIG. 20 is a view showing the operation of the fork lift truck loading mechanism of FIG. 9 when the fork lift truck is fully connected to the truck and the fork lift truck is lifted in midair.

When the fork lift truck 121 is lifted at the rear side of the truck 111 and the forks 127 and 128 are positioned at the lowest position of the mast 126 as shown in FIG. 20, the operation to lower the forks 127 and 128 is stopped and the fork lift truck 121 is kept held by the fork receivers 135 and 136 in this state. In this state, a pressure generating device (not shown) accommodated in the truck 111 is operated so as to supply oil under pressure to the hydraulic cylinders 145 and 146, whereby the piston rods 147 and 148 are pushed out from the hydraulic cylinders 145 and 146 so that the coupling arms 149 and 150 coupled to the piston rods 147 and 148 are pushed in the pushing direction of the piston rods 147 and 148. Accordingly, the fork receivers 135 and 136 fixed to the shaft supporters 130 and 131 are turned about the shaft 132 in the direction of arrow T in FIG. 21 so that the fork lift truck 121 is turned counterclockwise, preferably through an angle slightly in excess of 90°, while the forks 127 and 128 are engaged into and held by the fork receivers 135 and 136.

Figure 21:
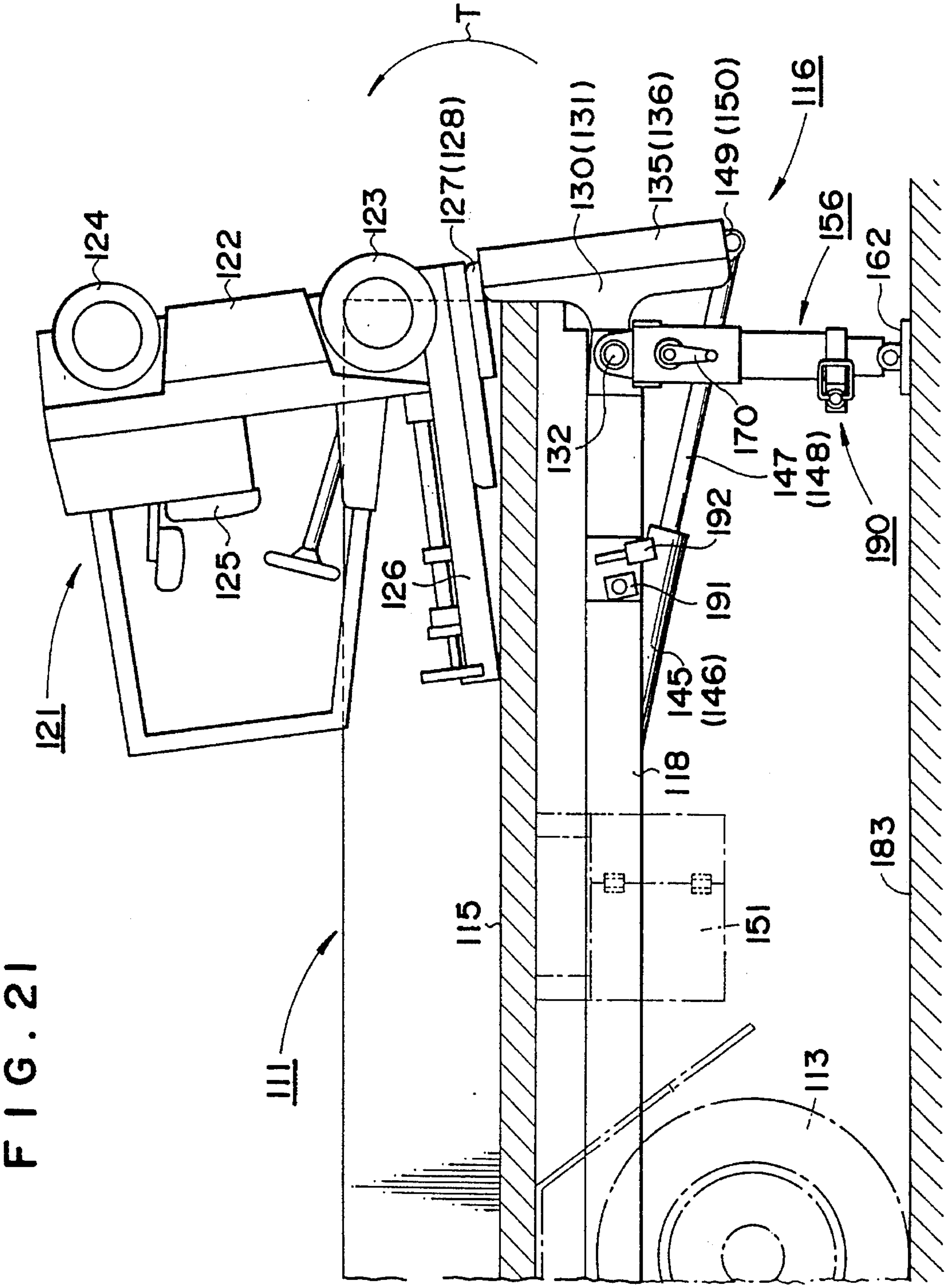
FIG. 21 is a view showing the operation of the fork lift truck loading mechanism of FIG. 9 when the fork lift truck is turned on the truck.

According, the chassis 122 of the fork lift truck 121 is raised into a forward inclined position as a whole onto the rear upper surface of the bed 115 of the truck 111 while the fork lift truck 121 is supported at three points in a state where the upper end of the mast 126 contact the bed 115 of the truck 111 as shown in FIG. 21. In this state, the center of gravity of the fork lift truck 121 is positioned on the bed 115 of the truck 111 so that the fork lift truck 121 can be stably located on the bed 115. In such a manner, if the fork lift truck 121 is located on the bed 115 of the truck 111, the operator operates the truck 111 in the known manner so as to move the truck 111 from one factory or warehouse to another factory or warehouse while carrying the fork lift truck 121 on the bed 115 of the truck 111. In case of carrying the fork lift truck 121, the fork lift truck 121 is turned as shown in FIG. 15 so as to raise the chassis 122 in a position exceeding the perpendicular position relative to the bed 115 of the truck 111. However, since the fork lift truck 121 employs a sealed battery as a power source, there is no likelihood of leakage of liquid or fuel.

Contrary to the aforementioned operations, namely, when the operator drivers the truck 111 on a public road and unloads the fork lift truck 121 from the bed 115 of the truck 111 after arrival at the destination, the operator performs the operations in the order of FIG. 21, FIG. 20 and FIG. 19. When unloading the fork lift truck 121, one operator can operate the truck 111 and fork lift truck 121 alternately without requiring an assistant operator. Contrary to the procedures as mentioned above, the truck 111 and the fork lift truck 121 can perform their own functions after unloading the fork lift truck 121 from the bed 115 of the truck 111. As a result, the operator can unload the cargo or pallet which is loaded on the bed of the truck in a short time or load the cargo or pallet on the bed 115 of the truck 111 using the fork lift truck 121.

When loading the fork lift truck 121 on the bed of the truck 111, since the fork receivers 135 and 136 are lifted at a forward inclined position exceeding the perpendicular position, the fork lift truck 121 is held on the bed 115 of the truck 111 while it is also positioned at a forward inclined position exceeding the perpendicular position. Accordingly, the center of gravity of the fork lift truck 121 is moved forward so that the fork lift truck 121 is stably loaded on the bed 115 since the mast 126, etc. contact the upper surface of the bed 115, whereby the fork lift truck 121 is prevented from coming off from the truck 111, and hence the fork lift truck 121 is not dropped from the bed 115 of the truck 111 even for a long time traveling of the truck 111. Since the fork lift truck 121 is positioned at the forward inclined position, the front and rear wheels 123 and 124 of the fork lift truck 121 do not protrude rearward and outside the bed 115.

Further, since the rear portion of the bed 115 of the truck 111 is supported by the supporting legs 156 and 157, the load or weight of the fork lift truck 121 can be received by the supporting legs 156 and 157 when loading the fork lift truck 121 on the bed 115 of the truck 111. Accordingly, if the loading mechanism 116 is applied to a truck having a long bed 115, namely, the truck having a bed which is long in length extending from the rear wheels 113 to the rear end of the bed 115, there is no likelihood that an excessive load is applied to the bed 115. Further, if the loading mechanism 116 is applied to a small truck, there is no likelihood that the front portion of the truck is lifted. Still furthermore, it is possible to smoothly and stably load or unload the fork lift truck 121 on the bed 115 of the truck 111.

Further, since the supporting means comprises a pair of left and right hydraulic jack type supporting legs 156 and 157, the height of the supporting means can be easily adjusted. Since the lower ends of the supporting legs 156 and 157 are turned about the upper ends thereof so as to be positioned along the lower portion of the bed 115, and the supporting legs 156 and 157 can be detachably held to the chassis 118 by inserting the retaining pins 101 into the openings 193 defined in the chassis 118, the supporting legs 156 and 157 do not cause any obstacle to the traveling of the truck 111 and they can be easily and quickly used when the fork lift truck 121 is loaded or unloaded from the truck 111.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A fork lift truck loading mechanism mounted on a movable truck for removably loading a fork lift truck onto the movable truck which said fork lift truck includes a pair of forwardly extending cantilevered forks, the loading mechanism comprising:

holding means which is supported by a chassis of the movable truck and reversibly turnable about a horizontal axis from a substantially horizontal position to a substantially upright position for removably receiving the forks of the fork lift truck and for holding the forks as said holding means is turned between said horizontal position and said upright position; and rotary means interposed between said truck and said holding means for turning said holding means between said horizontal position and said upright position whereby the fork lift truck is removably loaded onto said movable truck by said turning of the holding means such that the fork lift truck overlies a truck storage area of the movable truck.

2. A fork lift truck loading mechanism according to claim 1, wherein said holding means comprises a pair of elongate fork receivers turnably connected to said chassis and having openings which are substantially rectangular in cross section and into which the forks of said fork lift truck are inserted.

3. A fork lift truck loading mechanism according to claim 2, wherein said holding means includes adjustment means so that said fork receivers can be moved sidewardly along said horizontal axis and can be fixedly positioned so as to adjust the sideward spacing therebetween.

4. A fork lift truck loading mechanism according to claim 1, wherein said rotary means comprises a hydraulic cylinder which is interconnected between said movable truck and said holding means and includes a piston rod which is extended and contracted so as to turn the holding means.

5. A fork lift truck loading mechanism according to claim 1, wherein:

the holding means is disposed in an inclined position angling forwardly away from a rear end of the movable truck when in said substantially upright position.

6. A fork lift truck loading mechanism according to claim 5, wherein said holding means comprises a pair of elongate fork receivers turnably connected to said chassis and having openings which are substantially rectangular in cross section and into which the forks of said fork lift truck are inserted.

7. A fork lift truck loading mechanism according to claim 2, including supporting means connected to said holding means for supporting the chassis from the lower side thereof during said removable loading of the fork lift truck.

8. A fork lift truck loading mechanism according to claim 7, wherein said supporting means are jack type supporting legs, said supporting legs having upper ends which are pivotally connected respectively to the fork receivers, and lower ends which are swingable about the upper ends thereof into a storage position along said chassis, said supporting legs including retaining means so as to be detachably held to said chassis by said retaining means when in the storage position.

9. A fork lift truck loading mechanism according to claim 8, wherein said retaining means comprises a retaining pin which is urged by a spring in a direction in which said retaining pin protrudes, and an opening which is disposed at the storage position where the lower ends of the supporting legs are turned and into which the retaining pin is inserted.

10. A fork lift truck loading mechanism mounted on a movable truck for removably loading a fork lift truck onto the movable truck which said fork lift truck includes a pair of forwardly extending cantilevered forks, the loading mechanism comprising:

a pair of elongate fork receivers mounted on the rear portion of said truck in sidewardly spaced relation and having openings which are substantially rectangular in cross section and into which forks of said fork lift truck are inserted;

shaft supporters provided on the rear portion of said truck for supporting said fork receivers so that said fork receivers can be turned about a horizontal axis from a substantially horizontal position into a substantially upright position;

a pressurize cylinder having a base which is coupled to said movable truck so as to be turned relative to said movable truck; and a piston rod which is extended and contracted from said pressurize cylinder and has a tip end coupled to said fork receivers so as to be turned relative to said fork receivers, whereby the fork lift truck is removably loaded onto said movable truck by said turning of the fork receivers as said tip end is extended and contracted such that the fork lift truck overlies a truck bed area of the movable truck.

11. A fork lift truck loading mechanism according to claim 10, wherein said holding means includes adjustment means so that said fork receivers can be moved sidewardly along said horizontal axis and can be fixedly positioned so as to adjust the sideward spacing therebetween.

12. A fork lift truck loading mechanism mounted on a movable truck for removably loading a fork lift truck onto a bed of the movable truck, said fork lift truck including a pair of forwardly extending cantilevered forks, the loading mechanism comprising:

a shaft assembly comprising shaft support means connected to the truck and a shaft supported below the truck bed by said shaft support means, said shaft defining a horizontal pivot axis disposed below but adjacent a rear edge of said truck bed;

a pair of elongate fork receivers having first connection means connected to the shaft so that the fork receivers are pivotable about the horizontal axis between a horizontal position for releasable engagement with the forks of the fork lift truck and an upstanding position for positioning the fork lift truck onto the truck bed, said fork receivers being in a sidewardly spaced but parallel relation and having elongate openings into which forks of said fork lift truck are inserted; and rotary means drivingly inter-connected between said movable truck and said fork receivers for pivoting said fork receivers about said horizontal axis between the horizontal position and the upstanding position, whereby the fork lift truck is removably loaded onto the movable truck by pivoting of the fork receivers such that the fork lift truck is positioned to at least partially overlie and be supported on the truck bed.

13. A fork lift truck loading mechanism according to claim 12, wherein the fork receivers have second connection means spaced from said first connection means in a direction away from said first connection means and said truck bed, and said rotary means being connected to said second connection means.

14. A fork lift truck loading mechanism according to claim 13, wherein the first connection means and the second connection means each include adjustment means for releasably engaging the shaft and the rotary means respectively so as to permit adjustment of the spacing between the fork receivers.

15. A fork lift truck loading mechanism according to claim 14, wherein said rotary means comprises an extendible pressurize cylinder having opposite ends thereof pivotally connected to said movable truck and said second connection means so as to pivot said fork receivers about said horizontal axis from the horizontal position to the upstanding position during extension of said pressure cylinder.

16. A fork lift truck loading mechanism according to claim 15, including supporting means pivotably connected to the shaft so as to pivot between a downwardly extending support position for supporting the movable truck and an upwardly pivoted storage position.

17. A fork lift truck loading mechanism according to claim 16, wherein the supporting means comprise at least one elongate extendible support leg having a first leg portion pivotably connected to the shaft and a second leg portion which is telescopingly engaged with the first leg portion, said support leg being pivotable about the horizontal axis, the second leg portion including means for releasably connecting the second leg portion to the movable truck to retain the support leg in the storage position.

18. In combination, a movable vehicle having a chassis defining thereon an upwardly-facing load-accommodating bed which terminates at a rear free edge, and a loading mechanism mounted on said vehicle for engaging and swingably lifting a separate fork lift truck upwardly through an angle of substantially 90° so as to substantially position the fork lift truck directly over the truck bed adjacent the rear edge thereof, said fork lift truck having a pair of forwardly extending and generally parallel cantilevered forks, and said loading mechanism comprising:

support shaft means mounted on said chassis below said bed in the vicinity of the rear free edge thereof, said shaft means defining a generally horizontal pivot axis which extends transversely of the truck bed and is disposed below the bed in the vicinity of the rear free edge thereof;

fork receiver means supported by said chassis for swinging movement about said horizontal axis between a fork lift truck loading position and a fork lift truck storage position, said loading and storage positions being disposed about 90° apart;

said fork receiver means including a pair of generally hollow and elongate fork receiving members disposed in generally parallel but transversely spaced relation, each said fork receiving member defining therein an elongate opening which extends generally perpendicularly with respect to said horizontal pivot axis and which opens outwardly at a rearward end thereof for permitting one of the forks of the fork lift truck to be slidably inserted therein, said fork receiving members when in said loading position being disposed below said bed and being elongated generally horizontally rearwardly relative to the bed so that the rear ends of said fork receiving members are positioned below but in the vicinity of the rear free edge of said bed, said fork receiving members also being disposed below said horizontal pivot axis when in said loading position; and actuating means interposed between said chassis and said fork receiver means for controlling swinging movement of said fork receiver means between said loading and storage positions, said fork receiving members when in said storage position being positioned in a generally upright orientation adjacent but rearwardly of the bed and projecting upwardly to a position at least adjacent the bed so that a fork lift truck, when disposed with the forks engaged within the fork receiving members, is positioned directly over the bed in the vicinity of the rear free edge thereof.

19. A combination according to claim 18, wherein said actuating means includes an extendable and contractible fluid pressure cylinder means having one end thereof hingedly connected to said chassis and the other end thereof hingedly connected to said fork receiver means so as to define a horizontal hinge axis which is spaced from and positioned generally below said horizontal pivot axis.

20. The combination comprising:

a main load-supporting vehicle having a chassis defining an enlarged upwardly-facing load-accommodating bed which terminates at a rear free edge;

a separate motor-driven fork lift truck having a movable chassis provided on one end thereof with a vertically movable load engaging fork structure, said fork structure including a pair of generally parallel and sidewardly spaced elongated forks projecting forwardly in cantilevered relation; and a loading mechanism mounted on said vehicle under said bed adjacent the rear free edge thereof for telescopically engaging the forks of the fork lift truck to permit vertical upward swinging of the fork lift truck relative to the vehicle bed from a loading position to a storage position wherein the fork lift truck is disposed directly over said vehicle bed in the vicinity of said rear free edge, said loading mechanism including a pair of sidewardly spaced and elongated hollow fork receiving members disposed under said bed and extending generally horizontally rearwardly in said loading position for telescopically receiving said forks therein, and said fork receiving members when in said storage position being generally upright and being slightly forwardly inclined as they project upwardly so that the fork lift truck is supportingly engaged with the vehicle bed.

* * * * *

UNITED STATES PATENT AND TRADEMARK OFFICE

CERTIFICATE OF CORRECTION

PATENT NO. : 5,549,437

DATED : August 27, 1996

INVENTOR(S) : Mitsuhiro Kishi

It is certified that error appears in the above-indentified patent and that said Letters Patent is hereby corrected as shown below:

Column 16, line 13; change "claim 14" to ---claim 12---.

Signed and Sealed this

Twenty-first Day of January, 1997

Attest:

BRUCE LEHMAN

*Attesting Officer*

*Commissioner of Patents and Trademarks*